United States Patent
Zhang et al.

(10) Patent No.: US 11,617,152 B2
(45) Date of Patent: Mar. 28, 2023

(54) PASSIVE POSITIONING WITH SIDELINK ASSISTANCE

(71) Applicant: Qualcomm INCORPORATED, San Diego, CA (US)

(72) Inventors: Xiaoxia Zhang, San Diego, CA (US); Srinivas Yerramalli, Hyderabad (IN); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/354,108

(22) Filed: Jun. 22, 2021

(65) Prior Publication Data
US 2021/0410103 A1 Dec. 30, 2021

Related U.S. Application Data

(60) Provisional application No. 63/045,565, filed on Jun. 29, 2020.

(51) Int. Cl.
*H04W 64/00* (2009.01)
*G01S 5/02* (2010.01)
(Continued)

(52) U.S. Cl.
CPC ......... *H04W 64/006* (2013.01); *G01S 5/0236* (2013.01); *G01S 5/02216* (2020.05); *H04B 17/318* (2015.01); *H04L 5/0048* (2013.01)

(58) Field of Classification Search
CPC ... H04W 64/006; H04W 76/14; H04W 64/00; H04W 92/18; G01S 5/02216;
(Continued)

(56) References Cited

U.S. PATENT DOCUMENTS 9,439,039 B1 9/2016 Patil et al.
2018/0217228 A1* 8/2018 Edge ............... H04W 64/00
(Continued)

FOREIGN PATENT DOCUMENTS

WO 2017196510 A1 11/2017

OTHER PUBLICATIONS

3GPP TR 37.857: "3rd Generation Partnership Project; Technical Specification Group Radio Access Network; Study on Indoor Positioning Enhancements for UTRA and L TE (Release 13)", 3GPP Standard; Technical Report; 3GPP TR 37.857, 3rd Generation Partnership Project (3GPP), Mobile Competence Centre, 650, Route Des Lucioles, F-06921, Sophia-Antipolis Cedex, France, vol. RAN WG1, No. V13.1.0, Dec. 7, 2015 (Dec. 7, 2015), XP051294349, pp. 1-82, [retrieved on Dec. 7, 2015], Section 7.1.1.1, pp. 36-41, paragraph [0005].

(Continued)

*Primary Examiner* — Kabir A Timory
(74) *Attorney, Agent, or Firm* — Sunstein LLP/Qualcomm

(57) ABSTRACT

Techniques are provide for passive positioning of user equipment (UE) with sidelink assistance. An example method for passive positioning includes receiving a first positioning reference signal from a first station at a first time, receiving a second positioning reference signal from a second station at a second time, receiving positioning assistance data associated with positioning reference signals received by a proximate user equipment, determining a reference signal timing difference based at least in part on the first time and the second time, and determining a current location based at least in part on the reference signal timing difference and the positioning assistance data.

46 Claims, 15 Drawing Sheets

(51) Int. Cl.
*H04B 17/318* (2015.01)
*H04L 5/00* (2006.01)
(58) Field of Classification Search
CPC ........ G01S 5/0236; G01S 5/10; G01S 5/0072; H04B 17/318; H04L 5/0048; H04L 5/0078
See application file for complete search history.

(56) References Cited

U.S. PATENT DOCUMENTS

| | | | |
|---|---|---|---|
| 2021/0297216 A1* | 9/2021 | Shreevastav | G01S 1/20 |
| 2022/0229146 A1* | 7/2022 | Ko | G01S 5/0072 |

OTHER PUBLICATIONS

Intel Corporation: "Analysis of D2D Aided User Positioning", 3GPP Draft, R1-152636, 3GPP TSG RAN WG1 Meeting #81, Intel—OTDOA+D2D, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 16, 2015 (May 16, 2015), XP050973153, pp. 1-7, Retrieved from the Internet: URL: http://www.3gpp.org/ftp/tsg_ran/WG1_RL1/TSGR1_81/Docs/[retrieved on May 16, 2015] the Whole Document.

International Search Report and Written Opinion—PCT/US2021/038567—ISA/EPO—dated Oct. 12, 2021.

Koivsto M., et al., "High-Efficiency Device Positioning and Location-Aware Communications in Dense 5G Networks," IEEE Communications Magazine, vol. 55, No. 8, Aug. 31, 2017 (Aug. 31, 2017), 8 pages, XP011658291, ISSN: 0163-6804, DOI: 10 1109/MCOM. 2017.1600655, [retrieved on Aug. 7, 2017] abstract Tracking of Directional Parameters using EKFs.

LG Electronics: "Discussion on D2D Aided Positioning Enhancement," 3GPP Draft, 3GPP TSG RAN WG1 Meeting #81, R1-152755, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 16, 2015 (May 16, 2015), XP050973798, 4 pages, Retrieved from the Internet: URL: http://www.3gpp.org/ftp/tsg_ran/WG1_RL1/TSGR1_81/Docs/[retrieved on May 16, 2015] the whole document.

* cited by examiner

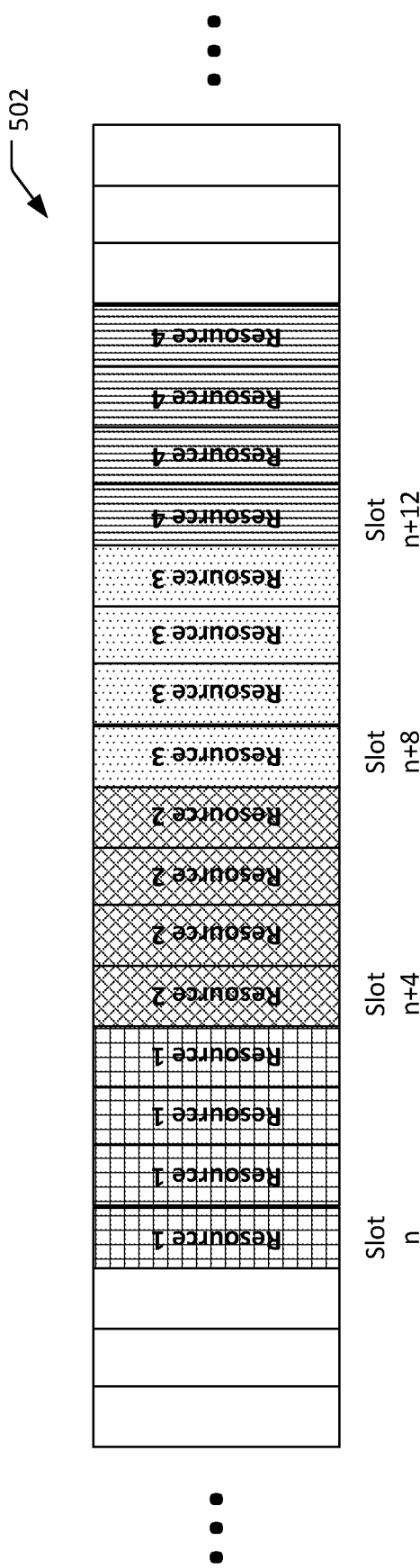
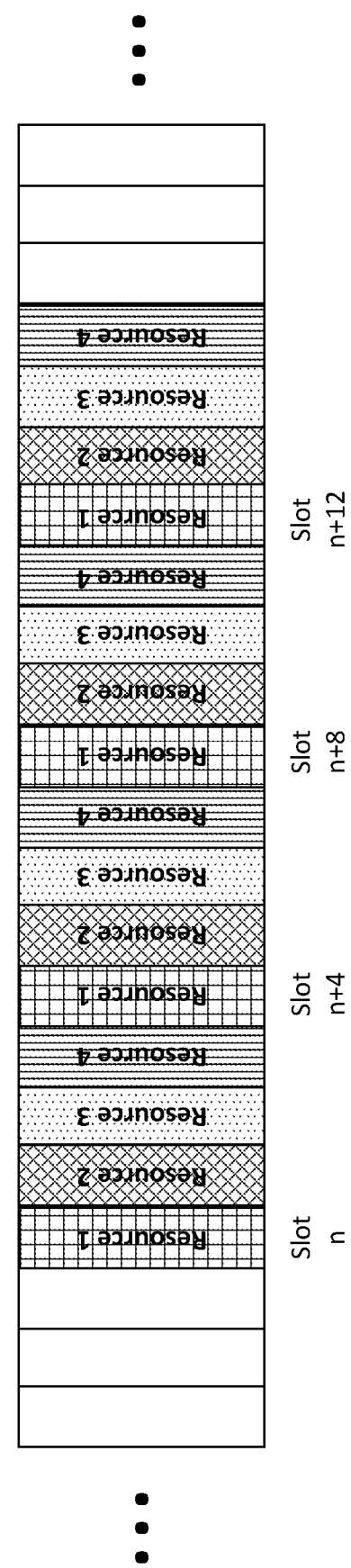
FIG. 5A
FIG. 5B

PASSIVE POSITIONING WITH SIDELINK ASSISTANCE

CROSS-REFERENCE TO RELATED APPLICATIONS

This application claims the benefit of U.S. Provisional Application No. 63/045,565, filed Jun. 29, 2020, entitled "PASSIVE POSITIONING WITH SIDELINK ASSISTANCE," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points.

SUMMARY

An example method for passive positioning according to the disclosure includes receiving a first positioning reference signal from a first station at a first time, receiving a second positioning reference signal from a second station at a second time, receiving positioning assistance data associated with positioning reference signals received by a proximate user equipment, determining a reference signal timing difference based at least in part on the first time and the second time, and determining a current location based at least in part on the reference signal timing difference and the positioning assistance data.

Implementations of a such a method may include one or more of the following features. The positioning assistance data may be received from the proximate user equipment via a sidelink. The positioning assistance data may be received from a serving station. The positioning assistance data may include a signal strength parameter associated with the positioning reference signals received by the proximate user equipment. The positioning reference signals may be received by the proximate user equipment are the first positioning reference signal and the second positioning reference signal. The positioning reference signals received by the proximate user equipment may be a first beamformed positioning reference signal transmitted from the first station, and a second beamformed positioning reference signal transmitted from the second station at least one of the positioning reference signals received by the proximate user equipment may be received at a different time compared to a transmission time of at least one of the first positioning reference signal and the second positioning reference signal. The positioning assistance data may be a second reference signal timing difference value based at least on part on the positioning reference signals received by the proximate user equipment. The positioning assistance data may be a synchronization error value based at least on part on the positioning reference signals received by the proximate user equipment. A receive period information indicating a time period the positioning assistance data is transmitted may be received.

An example method for providing positioning assistance data according to the disclosure includes receiving a first positioning reference signal from a first station at a first time, receiving a second positioning reference signal from a second station at a second time, determining a reference signal timing difference based at least in part on the first time and the second time, and transmitting generating positioning assistance data, such that the positioning assist assistance data is based at least in part on the reference signal timing difference.

Implementations of such a method may include one or more of the following features. The positioning assistance data may be transmitted to a proximate user equipment via a sidelink. The positioning assistance data may be transmitted to a serving station. A signal strength parameter associated with at least one of the first positioning reference signal and the second positioning reference signal may be determined. At least one of the first positioning reference signal and the second positioning reference signal may be an omnidirectional positioning reference signal. At least one of the first positioning reference signal and the second positioning reference signal may be an beamformed positioning reference signal. The positioning assistance data may be the reference signal timing difference. The positioning assistance data may be a synchronization error value based at least on part on the first positioning reference signal and the second positioning reference signal. A transmit period information indicating a time period to transmit the positioning assistance data may be received. The positioning assistance data may be transmitted during the transmit period via a sidelink. The first positioning reference signal and the second positioning reference signal may utilize different frequency layers.

An example user equipment (UE) according to the disclosure includes a memory, at least one transceiver, at least one processor communicatively coupled the memory and the at least one transceiver and configured to receive a first positioning reference signal from a first station at a first time, receive a second positioning reference signal from a second station at a second time, receive positioning assistance data associated with positioning reference signals received by a proximate user equipment, determine a reference signal timing difference based at least in part on the first time and the second time, and determine a current location based at least in part on the reference signal timing difference and the positioning assistance data.

Implementations of such a UE may include one or more of the following features. The positioning assistance data may be received from the proximate user equipment via a sidelink. The positioning assistance data may be received from a serving station. The positioning assistance data may include a signal strength parameter associated with the positioning reference signals received by the proximate user equipment. The positioning reference signals received by the proximate user equipment may be the first positioning reference signal and the second positioning reference signal. The positioning reference signals received by the proximate user equipment may be a first beamformed positioning reference signal transmitted from the first station, and a second beamformed positioning reference signal transmitted from the second station. At least one of the positioning reference signals received by the proximate user equipment may be received at a different time compared to a transmission time of at least one of the first positioning reference signal and the second positioning reference signal. The positioning assistance data may be a second reference signal timing difference value based at least on part on the positioning reference signals received by the proximate user equipment. The positioning assistance data may be a synchronization error value based at least on part on the positioning reference signals received by the proximate user equipment. The at least one processor may be further configured to receive a receive period information indicating a time period the positioning assistance data is transmitted.

An example user equipment (UE) according to the disclosure includes a memory, at least one transceiver, at least one processor communicatively coupled the memory and the at least one transceiver and configured to receive a first positioning reference signal from a first station at a first time, receive a second positioning reference signal from a second station at a second time, determine a reference signal timing difference based at least in part on the first time and the second time, and transmit positioning assistance data, such that the positioning assistance data is based at least in part on the reference signal timing difference.

Implementations of such a UE may include one or more of the following features. The positioning assistance data may be transmitted to a proximate user equipment via a sidelink. The positioning assistance data may be transmitted to a serving station. The at least one processor may be further configured to determine a signal strength parameter associated with at least one of the first positioning reference signal and the second positioning reference signal. At least one of the first positioning reference signal and the second positioning reference signal may be an omnidirectional positioning reference signal. At least one of the first positioning reference signal and the second positioning reference signal may be an beamformed positioning reference signal. The positioning assistance data may be the reference signal timing difference. The positioning assistance data may be a synchronization error value based at least on part on the first positioning reference signal and the second positioning reference signal. The at least one processor may be further configured to receive transmit period information indicating a time period to transmit the positioning assistance data. The positioning assistance data may be transmitted during the transmit period via a sidelink. The first positioning reference signal and the second positioning reference signal may utilize different frequency layers.

An example apparatus according to the disclosure includes means for receiving a first positioning reference signal from a first station at a first time, means for receiving a second positioning reference signal from a second station at a second time, means for receiving positioning assistance data associated with positioning reference signals received by a proximate user equipment, means for determining a reference signal timing difference based at least in part on the first time and the second time, and means for determining a current location based at least in part on the reference signal timing difference and the positioning assistance data.

An example apparatus according to the disclosure includes means for receiving a first positioning reference signal from a first station at a first time, means for receiving a second positioning reference signal from a second station at a second time, means for determining a reference signal timing difference based at least in part on the first time and the second time, and means for transmitting positioning assistance data, wherein the positioning assistance data is based at least in part on the reference signal timing difference.

An example non-transitory processor-readable storage medium comprising processor-readable instructions configured to cause one or more processors to determine a current location according to the disclosure includes code for receiving a first positioning reference signal from a first station at a first time, code for receiving a second positioning reference signal from a second station at a second time, code for receiving positioning assistance data associated with positioning reference signals received by a proximate user equipment, code for determining a reference signal timing difference based at least in part on the first time and the second time, and code for determining the current location based at least in part on the reference signal timing difference and the positioning assistance data.

An example non-transitory processor-readable storage medium comprising processor-readable instructions configured to cause one or more processors to provide positioning assistance data according to the disclosure includes code for receiving a first positioning reference signal from a first station at a first time, code for receiving a second positioning reference signal from a second station at a second time, code for determining a reference signal timing difference based at least in part on the first time and the second time, and code for transmitting positioning assistance data, wherein the positioning assistance data is based at least in part on the reference signal timing difference.

Items and/or techniques described herein may provide one or more of the following capabilities, as well as other capabilities not mentioned. Two or more stations may transmit positioning reference signals. A helper user equipment with a known location may receive positioning reference signals from the two or more stations and determine reference signal timing differences for pairs of the stations. The location of the helper user equipment and the reference signal timing differences may be transmitted to proximate user equipment via sidelinks. The proximate user equipment may utilize the received location and timing information to reduce synchronization errors associated with the two or more stations. The helper user equipment may be configured to determine synchronization errors based on the received positioning reference signals and transmit the synchronization errors to the proximate user equipment and to the network. The network may be configured to provide the synchronization error values to other stations. Position estimates performed by user equipment may be improved. Positioning messaging overhead may be reduced. Other capabilities may be provided and not every implementation according to the disclosure must provide any, let alone all, of the capabilities discussed.

BRIEF DESCRIPTION OF THE DRAWINGS

FIGS. 5A and 5B illustrate example downlink positioning reference signal resource sets.

DETAILED DESCRIPTION

Figure 1:
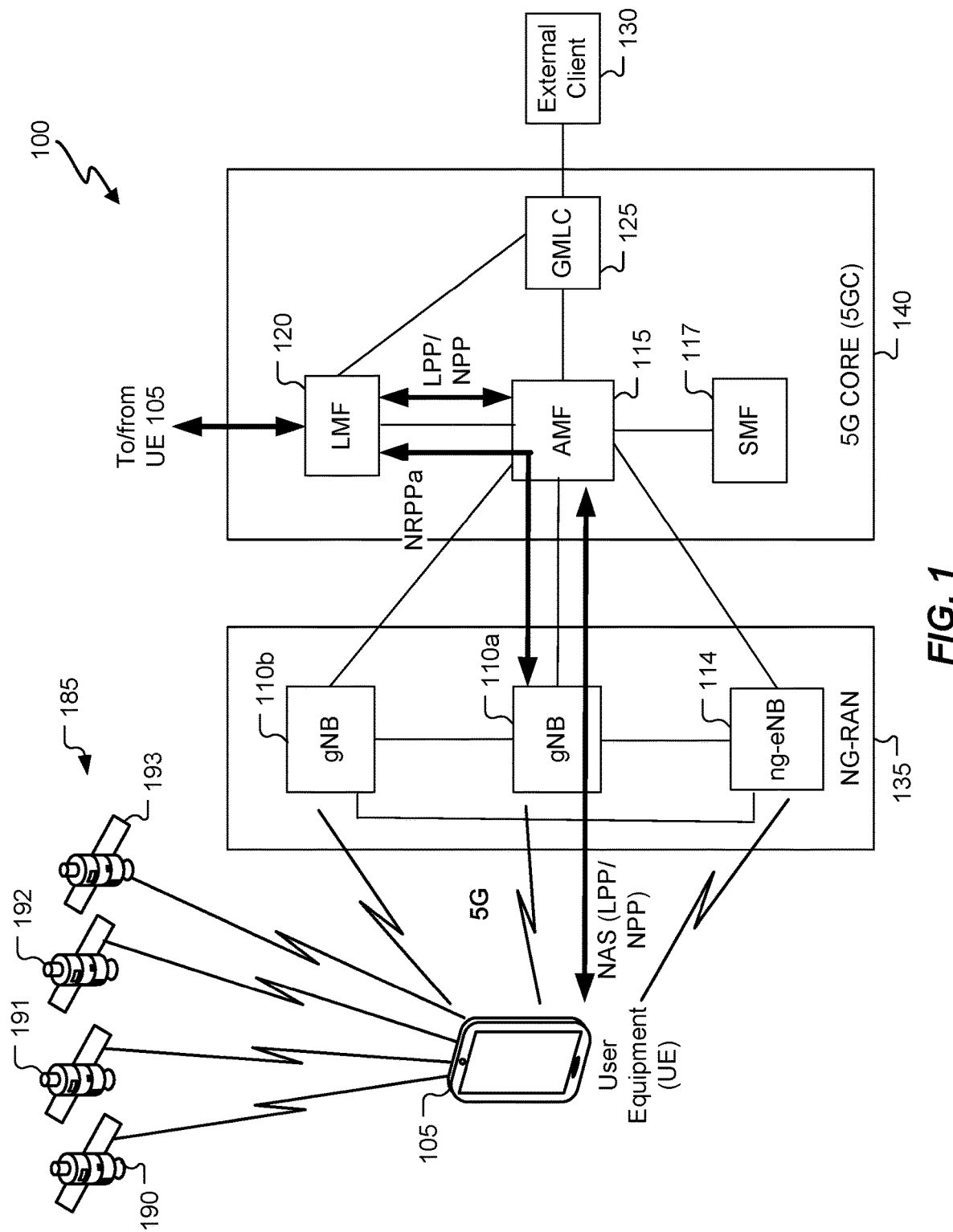
FIG. 1 is a simplified diagram of an example wireless communications system.

Techniques are discussed herein for passive positioning of user equipment (UE) with sidelink assistance. 5G NR includes several positioning methods such as downlink (DL) and uplink (UL) Time Difference of Arrival (TDOA), DL Angle of Departure (AoD), UL Angle of Arrival (AoA), DL initiated Round Trip Time (RTT), and combinations of these methods. In general, some TDOA methods may require network synchronization. In contrast, RTT based methods are not dependent on network synchronization. Simultaneously positioning user equipment in high density areas (e.g., stadiums, convention centers, Internet of Things (IoT) installations, and Industrial IoT (IIoT), etc.) may present challenges associated with messaging and bandwidth limitations. For example, RTT methods require transmissions from each UE and thus may not be scalable in UE dense environments. DL TDOA based methods, however, with time synchronized NR networks may be scaled to a large number of devices without exceeding bandwidth limitations. For example, fixed overhead positioning reference signal (PRS) transmissions from base stations may be used. The PRS transmissions are independent from the number of UEs and the UEs are not required to transmit responses to the PRS transmissions.

In general, the accuracy of passive positioning is dependent on measuring the time of flight of a radio signal between two stations. The transmitter and receiver chains between the antenna elements and the respective signal processing units may introduce synchronization timing errors between the expected and actual receive and transmit times. Group delay and frequency response problems may also add to the timing errors. The position estimate based on positioning reference signals may be inaccurate due to these synchronization timing errors. For example, a 1 millisecond (msec) error may result in positioning errors of approximately 300 meters. The techniques provided herein may be used to reduce the impact of the synchronization timing errors on the resulting position estimates. In an example, network stations may send positioning reference signals (PRSs) to target user equipment (UE). The network stations may also broadcast assistance data including timing values associated with the PRSs. A helping UE, with a known location, may also detect the PRSs. In IoT and IIoT use cases, the helping UE may be a Programable Logic Controller (PLC) disposed proximate to the target UE. In a Vehicle-to-Everything (V2X) use case, the helper UE may be a Roadside Unit (RSU) configured to communicate with the target UE (e.g., a vehicle) when the target UE is in range. The helper UE may be other devices in a known location. The target UE observes the target reference signal timing difference ($RSTD_T$) of the PRSs transmitted by the stations, where the $RSTD_T$ includes the synchronization timing errors between the stations. The helping UE also observes the PRSs and determines a helper RSTD (i.e., $RSTD_H$), which includes the same synchronization timing errors between the stations. The helper UE may provide $RSTD_H$ and location information to the target UE via a sidelink channel and interface (e.g., PC5, or other device-to-device (D2D) technology). The target UE is configured to perform a differential between the $RSTD_T$ and the $RSTD_H$ to effectively remove the synchronization timing errors. That is, the target UE determines an $RSTD_{T\_true}$ based on the PRSs, the network assistance data, and the assistance data provided by the helper UE. Since the synchronization timing errors are removed from the $RSTD_{T\_true}$ value, the accuracy of the position estimate may improve. The helping UE, and additional helping UEs, may provide assistance data associated with other PRSs and other stations. These techniques and configurations are examples, and other techniques and configurations may be used.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS)

protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. In an example, the LMF 120 may be collocated with the NG-RAN 135 and be configured to communicate with the UE 105 via Radio Resource Control (RRC) signaling.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional PRS or SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
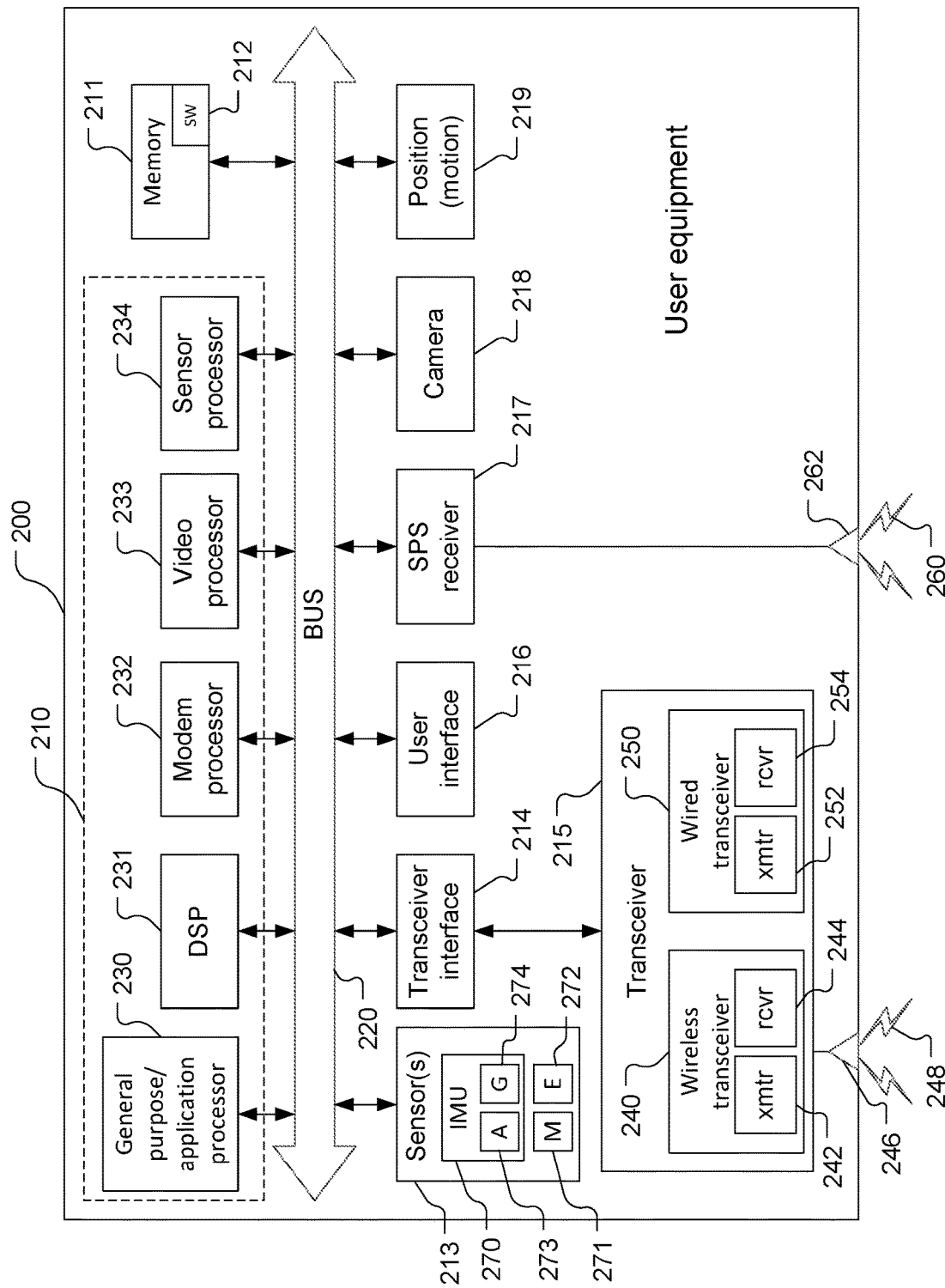
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
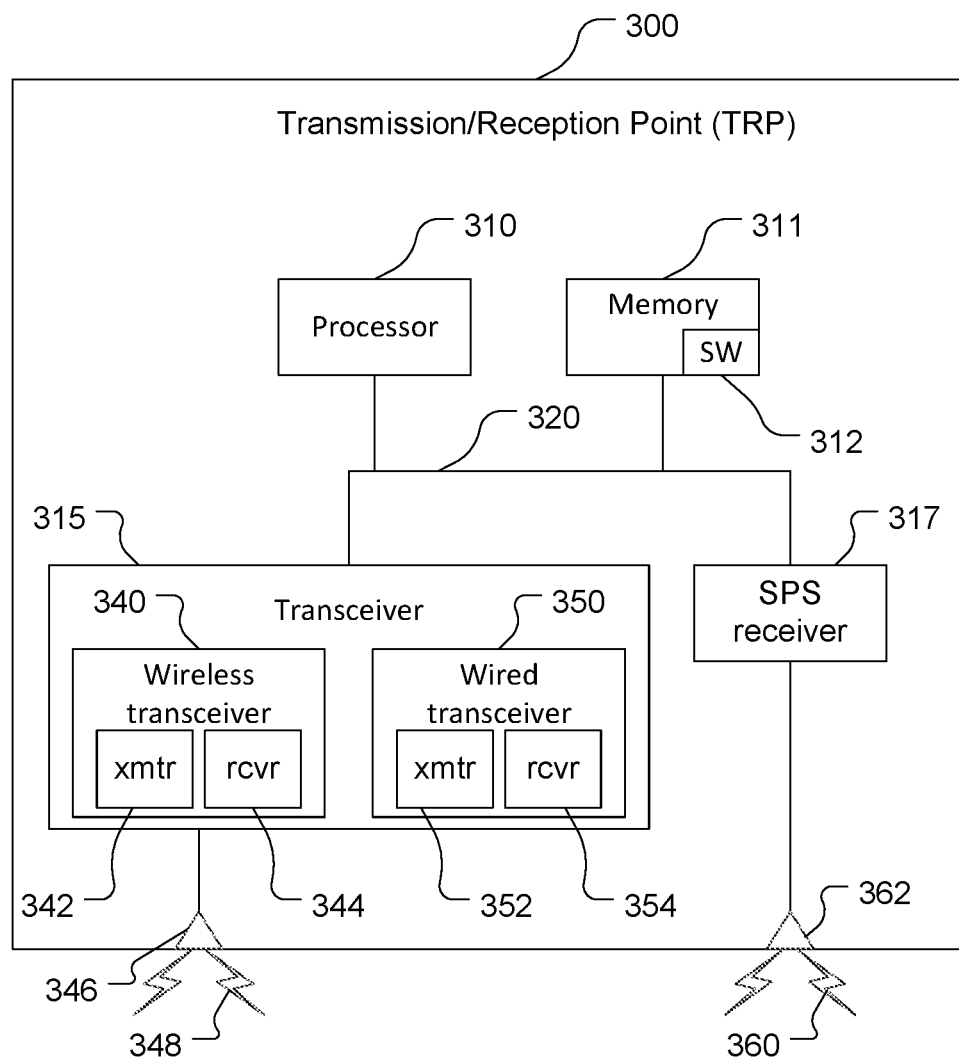
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
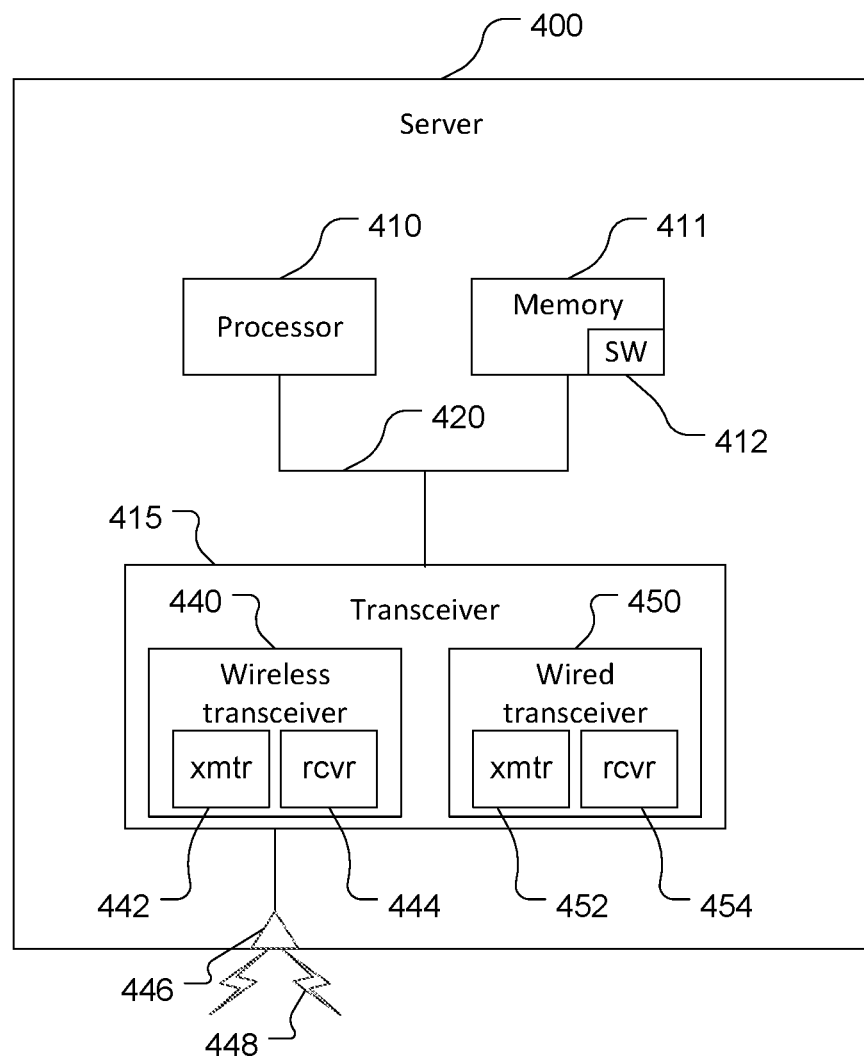
FIG. 4 is a block diagram of components of an example server shown in FIG. 1.

Referring also to FIG. 4, an example of the LMF 120 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
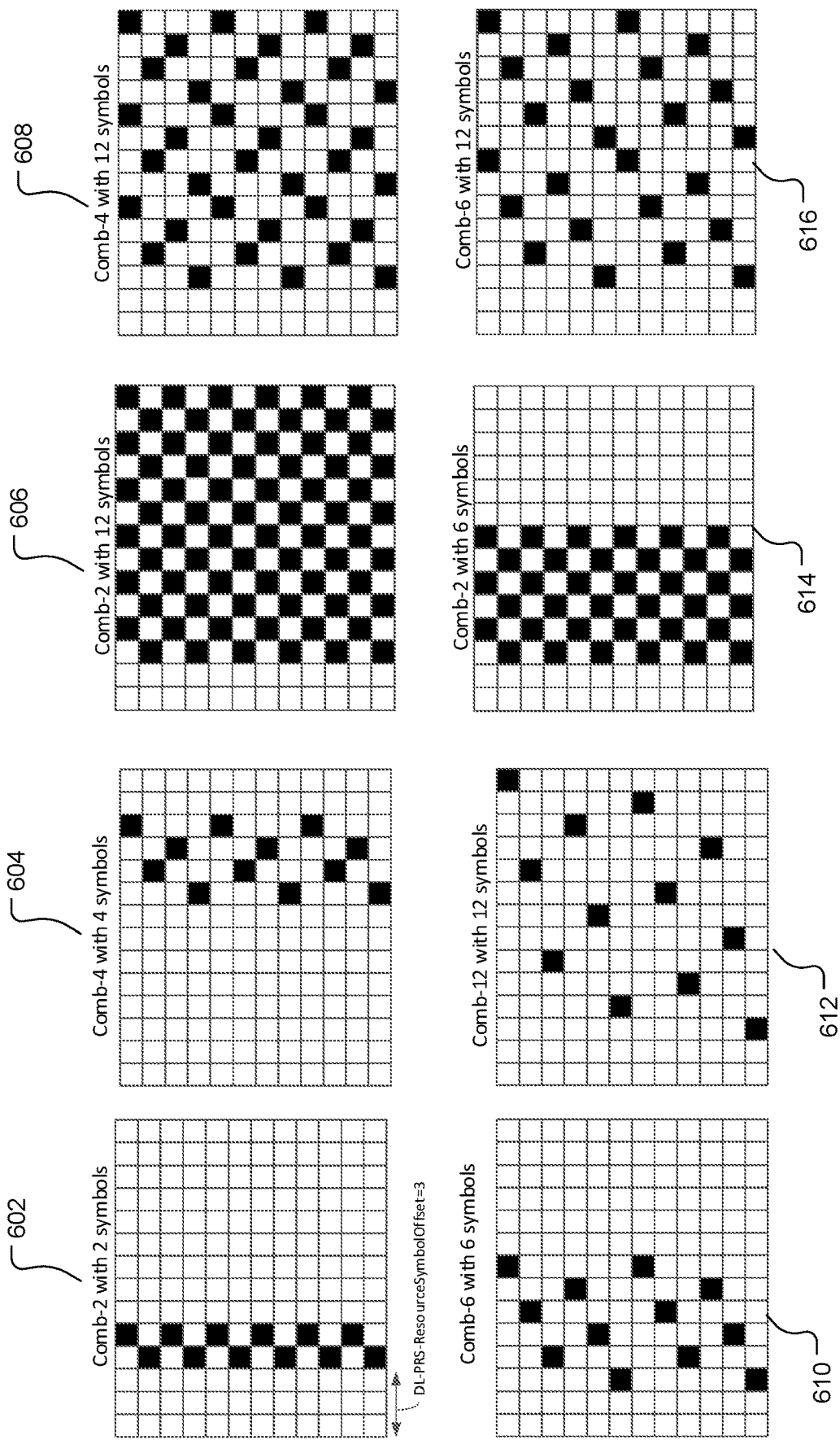
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

In an example, a positioning frequency layer may be a collection of PRS resource sets across one or more base stations. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS.

A PRS occasion is one instance of a periodically repeated time window (e.g., a group of one or more consecutive slots) where PRS are expected to be transmitted. A PRS occasion may also be referred to as a PRS positioning occasion, a positioning occasion, or simply an occasion.

Note that the terms positioning reference signal and PRS are reference signals that can be used for positioning, such as but not limited to, PRS signals in LTE, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

Figure 7:
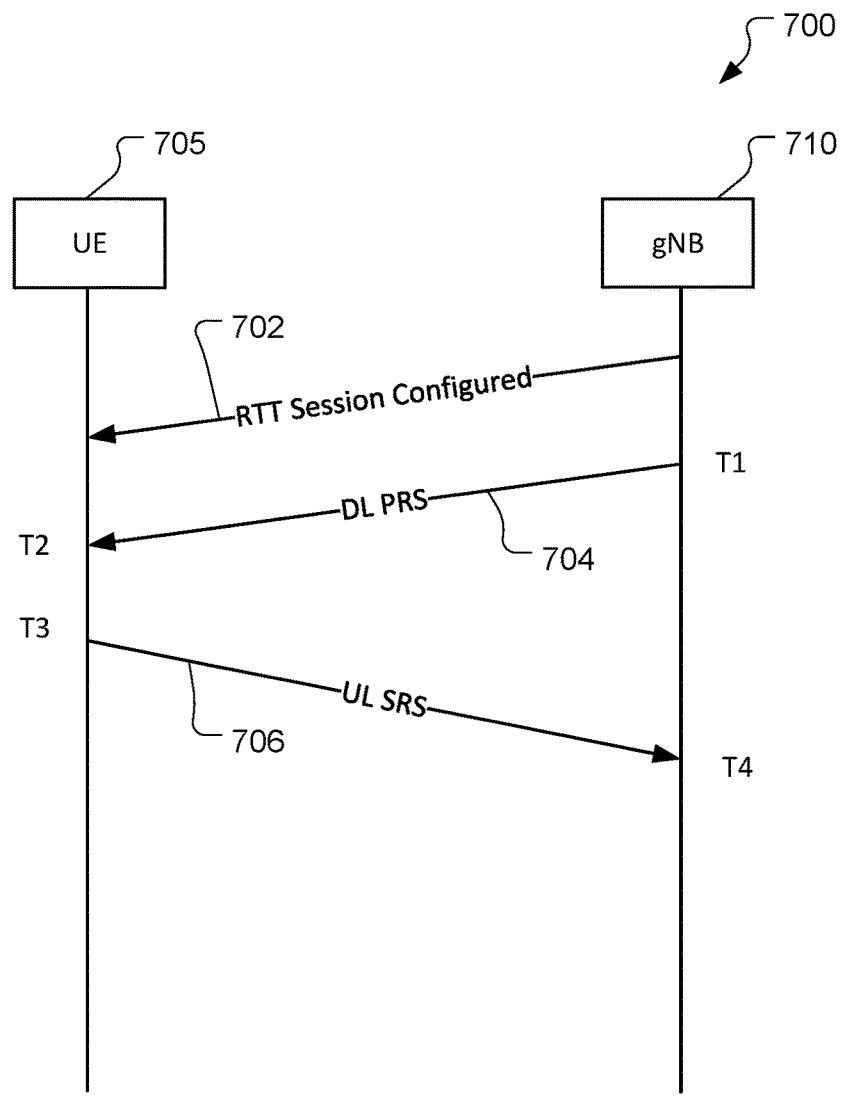
FIG. 7 is an example round trip time message flow between a user equipment and a base station.

Referring to FIG. 7, an example round trip message flow 700 between a user equipment 705 and a base station 710 is shown. The UE 705 is an example of the UE 105, 200 and the base station 710 may be a gNB 110a-b or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 700 may be initiated by the base station 710 with a RTT session configured message 702. The base station may utilize the LPP/NRPPa messaging to configure the RTT session. At time T1, the base station 710 may transmit a DL PRS 704, which is received by the UE 705 at time T2. In response, the UE 705 may transmit a Sounding Reference Signal (SRS) for positioning message 706 at time T3 which is received by the base station 710 at time T4. The distance between the UE 705 and the base station 710 may be computed as:

$$\text{distance} = \frac{c}{2}((T4 - T1) - (T3 - T2)) \quad (1)$$

where $c$ = speed of light.

In dense operating environments, where there are many UEs exchanging RTT messages with base stations, the bandwidth required for the UL SRS for positioning messages may increase the messaging overhead and utilize excess network bandwidth. Passive positioning techniques may reduce the bandwidth required for positioning by eliminating transmissions from the UE.

Figure 8:
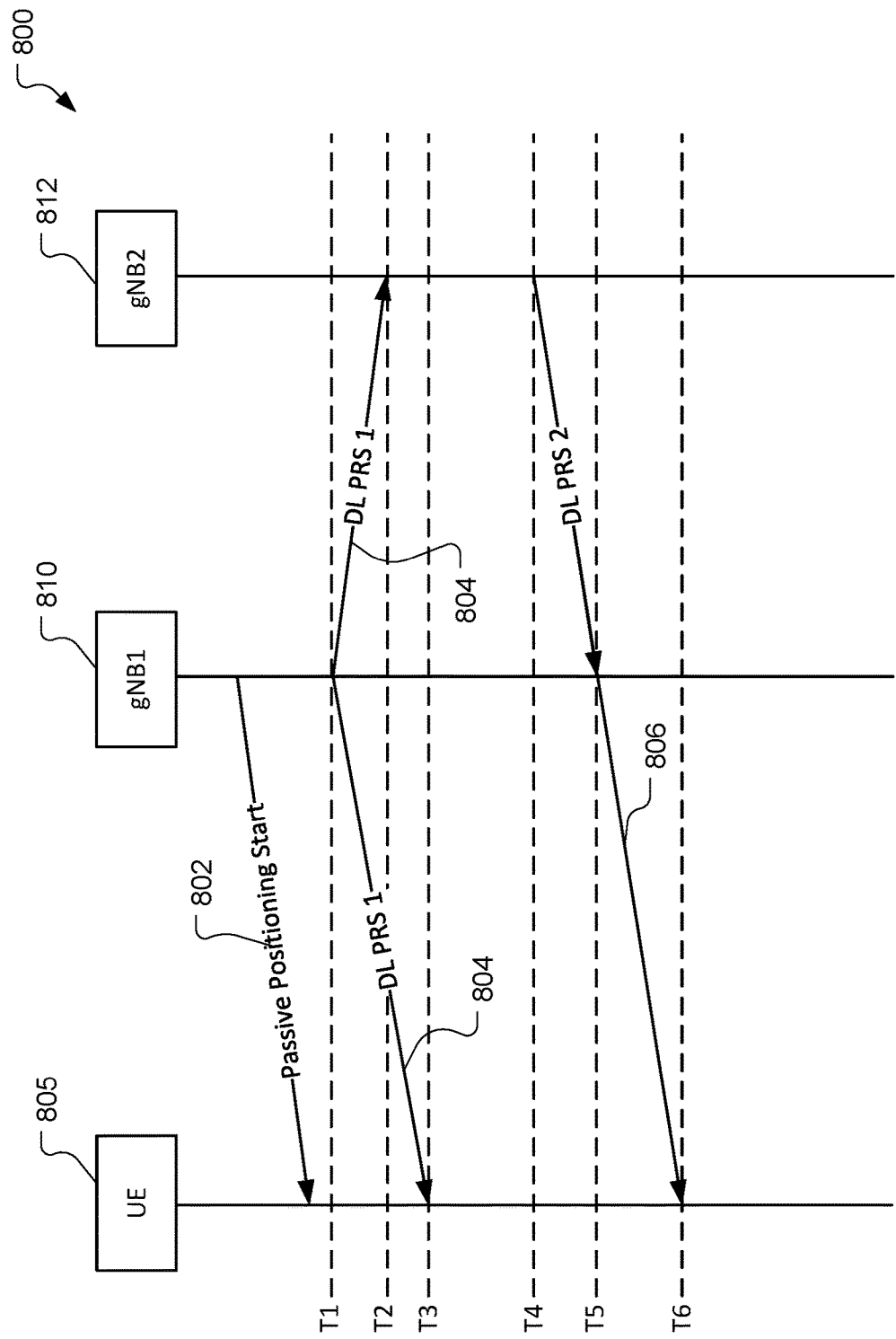
FIG. 8 is an example message flow for passive positioning of a user equipment.

Referring to FIG. 8, an example message flow 800 for passive positioning of a user equipment 805 is shown. The message flow includes the UE 805, a first base station 810 and a second base station 812. The UE 805 is an example of the UEs 105, 200, and the base stations 810, 812 are examples of the gNBs 110a-b or ng-eNB 114. In general, TDOA positioning techniques utilize the difference in travel times between one entity and other entities to determine relative ranges from the other entities and those, combined with known locations of the other entities may be used to determine the location of the one entity. Angles of arrival and/or departure may be used to help determine a location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). In operation, the first base station 810 may provide a passive positioning start message 802 to the UE 805. The passive positioning start message 802 may be a broadcast message, or other signaling such as RRC, to inform the UE of a PRS transmission schedule and may include transmission information (e g, channel information, muting patterns, PRS bandwidth, PRS identification information, etc.). At time T1, the first station may transmit a first DL PRS 804 which may be received by the second base station 812 at time T2 (for example), and by the UE 805 at time T3. The second base station 812 may be configured to transmit a second DL PRS 806 at time T4, which is received by the first base station 810 at time T5 and by the UE 805 at time T6. The time between T2 and T4 may be a configured turnaround time on the second base station 812 and thus a known period of time. The time between T1 and T2 (i.e., time of flight) may also be known because the first and second base stations 810, 812 are in fixed locations. The turnaround time (i.e., T4-T2) and the time of flight (i.e., T2-T1) may be broadcast or otherwise provided to the UE 805 for use in positioning calculations. The UE 805 may observe the difference between T6 and T3, and the distances may be computed as:

$$D_{gNB1-UE} = \frac{c}{2}((T_3 - T_1)) \quad (2)$$

$$D_{gNB2-UE} = \frac{c}{2}((T_6 - T_1) - (T_4 - T_2) - (T_2 - T_1)) = \frac{c}{2}(T_6 - T_4) \quad (3)$$

$$D_{gNB2-UE} - D_{gNB1-UE} = \frac{c}{2}((T_6 - T_3) - (T_4 - T_2) - (T_2 - T_1)) \quad (4)$$

The message flow 800 is generally adequate when the first base station 810 and the second base station 812 have synchronized timelines and the respective transmit and receive chains are calibrated. Group delays and other device related issues may cause timing delays between RF circuits and the antennas. Such synchronization timing errors may decrease the accuracy of position estimates derived from the RSTD results of equations (2)-(4).

Figure 9:
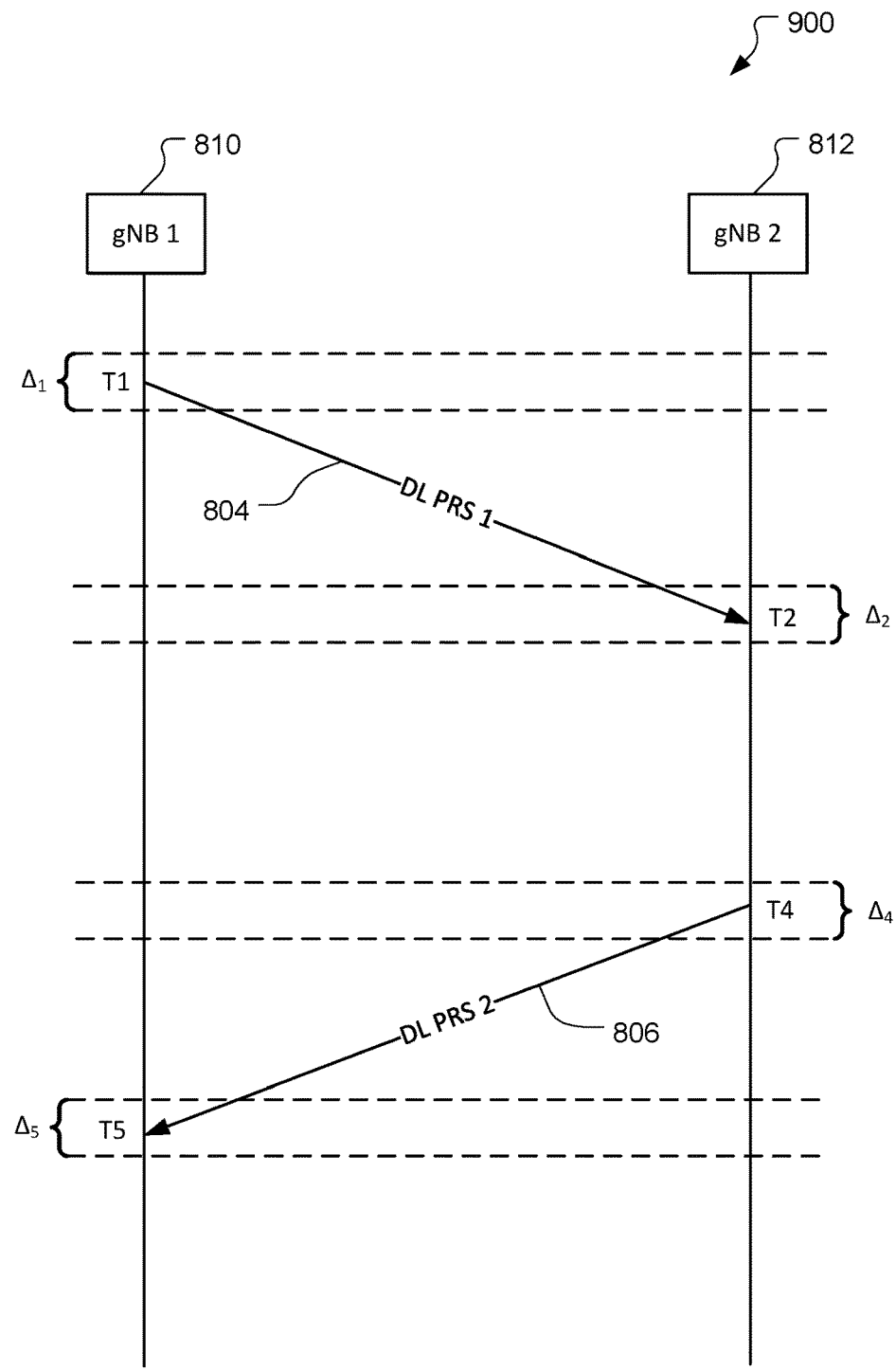
FIG. 9 is an example message flow between stations with associated transmit and receive time errors.

Referring to FIG. 9, with further reference to FIG. 8, an example message flow 900 between the first base station 810 and the second base station 812 is shown. The time of flight (T2-T1) and the turnaround time (T4-T2) may be established based on the depicted RTT exchange between the first and second base stations 810, 812. Each of the time values (e.g., T1, T2, T4, T5) may include errors due to the corresponding receive and transmit chain elements. For example, the time values may have errors ranges $\Delta_1$, $\Delta_2$, $\Delta_4$, $\Delta_5$ and the respective time values may drift within the error ranges. The RTT value may also vary based on changes in temperature. These changes may require frequent RTT calibrations between the base stations 810, 812 to support passive positioning. The passive positioning with sidelink described herein may be used to reduce and maybe eliminate the frequency of RTT calibrations between network stations. The techniques may also reduce the need for network timing synchronizations.

Figure 10:
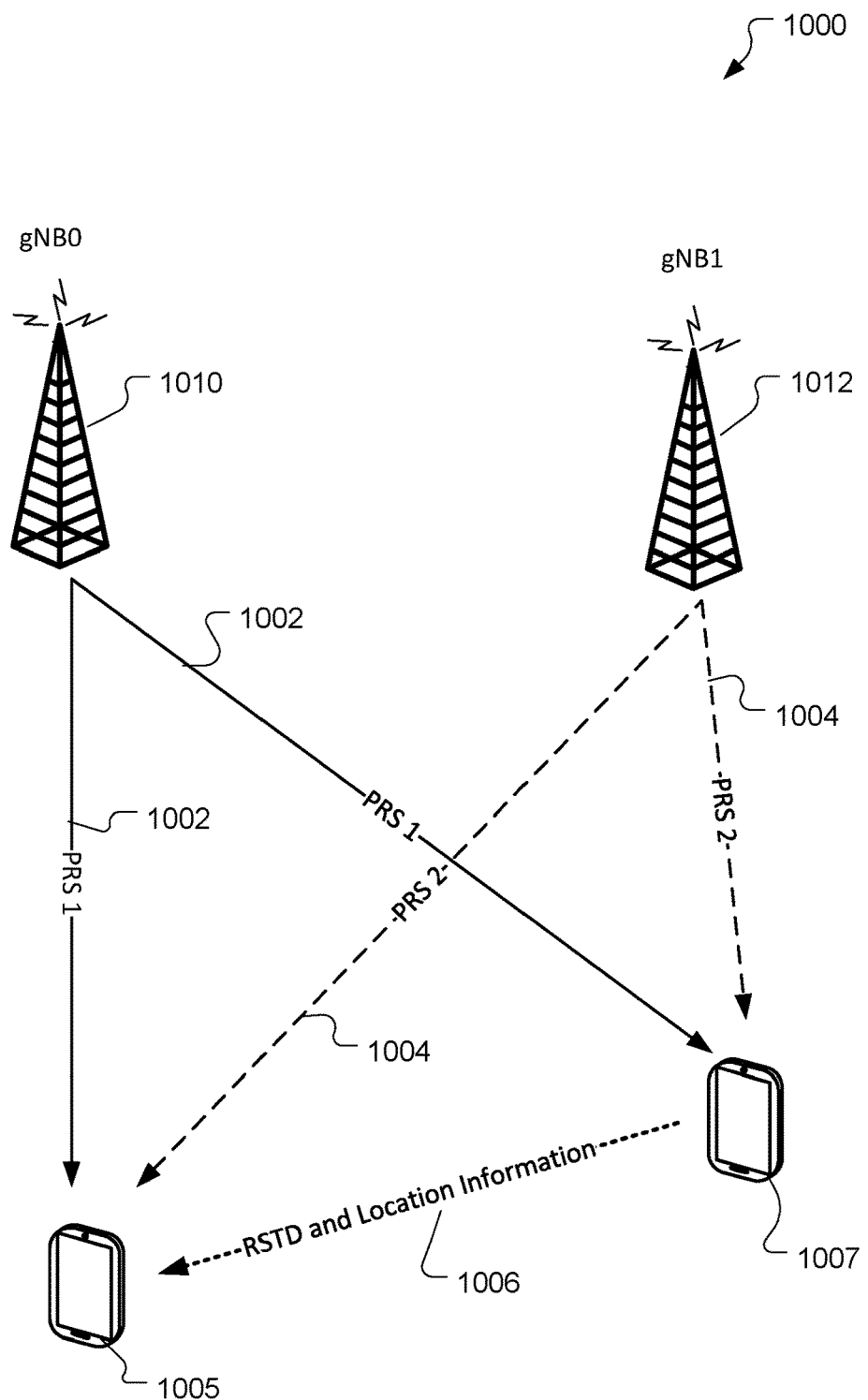
FIG. 10 is an example signaling diagram for passive positioning with sidelink assistance.

Referring to FIG. 10, with further reference to FIG. 8, an example signaling diagram 1000 for passive positioning with sidelink assistance is shown. The diagram 1000 includes a first station 1010, a second station 1012, a target UE 1005, and a helper UE 1007. The UEs 1005, 1007 are examples of the UEs 105, 200 and the stations 1010, 1012 may be gNBs 110a-b or ng-eNBs 114, or other TRPs 300. In an example, the helper UE 1007 may be other types of TRPs 300, such as an RSU, access point, femto cell, pico cell, etc. The locations of the first and second stations 1010, 1012 (e.g., time of flight value), and the turnaround time value for the second station 1012 are known. The time of flight and turnaround values may be provided to the target UE 1005 in a passive positioning start message 802, or via a broadcast or other signaling techniques (e.g., RRC, SIBs, LPP, etc.). The first station 1010 transmits a first PRS 1002 at a first time (e.g., T1 on FIG. 8), which is received by the target UE 1005 and the helper UE 1007. The second station 1012 sends a second PRS 1004 at a second time (e.g., T4 on FIG. 8), which is received by the target UE 1005 and the helper UE 1007. The helper UE 1007 is in a known location and thus the distances to the first station 1010 and to the second station 1012 are also known. The helper UE 1007 determines the RSTD for the first and second PRS 1002, 1004 and sends the RSTD and location information via a sidelink transmission 1006. The sidelink transmission 1006 may utilize a sidelink physical layer structure and corresponding numerologies. For example, in 5G NR the sidelink transmission may utilize a physical sidelink control channel (PSCCH), a physical sidelink shared channel (PSSCH), physical sidelink broadcast channel (PSBCH), etc. A V2X use case may utilize the PC5 interface. Other technologies and interfaces may be used to support the sidelink transmission 1006. The target UE 1005 is configured to utilize the RSTD and location of the helper UE 1007, and the locations of the first and second stations 1010, 1012 to mitigate the synchronization errors between the stations. For example, the time of flight between the stations 1010, 1012 (i.e., T2-T1 on FIG. 8) is known based on the locations of the respective antennas. The turnaround time (i.e., T4-T2 on FIG. 8) is known because the respective distances between the helper UE 1007 and the stations 1010, 1012 are known. Thus, the RSTD value observed on the helper UE 1007 removes the error of the station timing which may deviate from previously provided assistance data. That is, the RSTD value observed on the helper UE 1007 is based on the actual transmissions of the first and second PRSs 1004, 1006 and not the expected turnaround time contained in the assistance data (e.g., as depicted in FIG. 9). The target UE 1005 may utilize the received RSTD and location information to improve the accuracy of the distance computations provided in equations (2)-(4) associated with the first and second stations 1010, 1012.

While FIG. 10 depicts a pair of stations 1010, 1012 and a single helper UE 1007, in operation the target UE 1005 may receive PRSs from other pairs and combinations of stations, and receive sidelink assistance data from other helper UEs. The helper UEs may be configured to provide sidelink assistance data for various combinations of station pairs. In an embodiment, the PRS may be transmitted from one or more stations 1010, 1012 via Uu interface. In another example, the PRS may be transmitted using the sidelink (e.g., PC5) link from other UEs. The stations 1010, 1012 and the corresponding PRSs may be on the same frequency layer or different frequency layers. In an embodiment, such as use cases with dynamic spectrum sharing, the stations 1010, 1012 may be configured to transmit PRSs with different radio access technologies (e.g., LTE, 5G, sub 6 GHz, mmW, etc.). The PRSs 1002, 1004 may be configured as on-demand PRSs and may be transmitted in response to a signal received from the target UE 1005.

Figure 11:
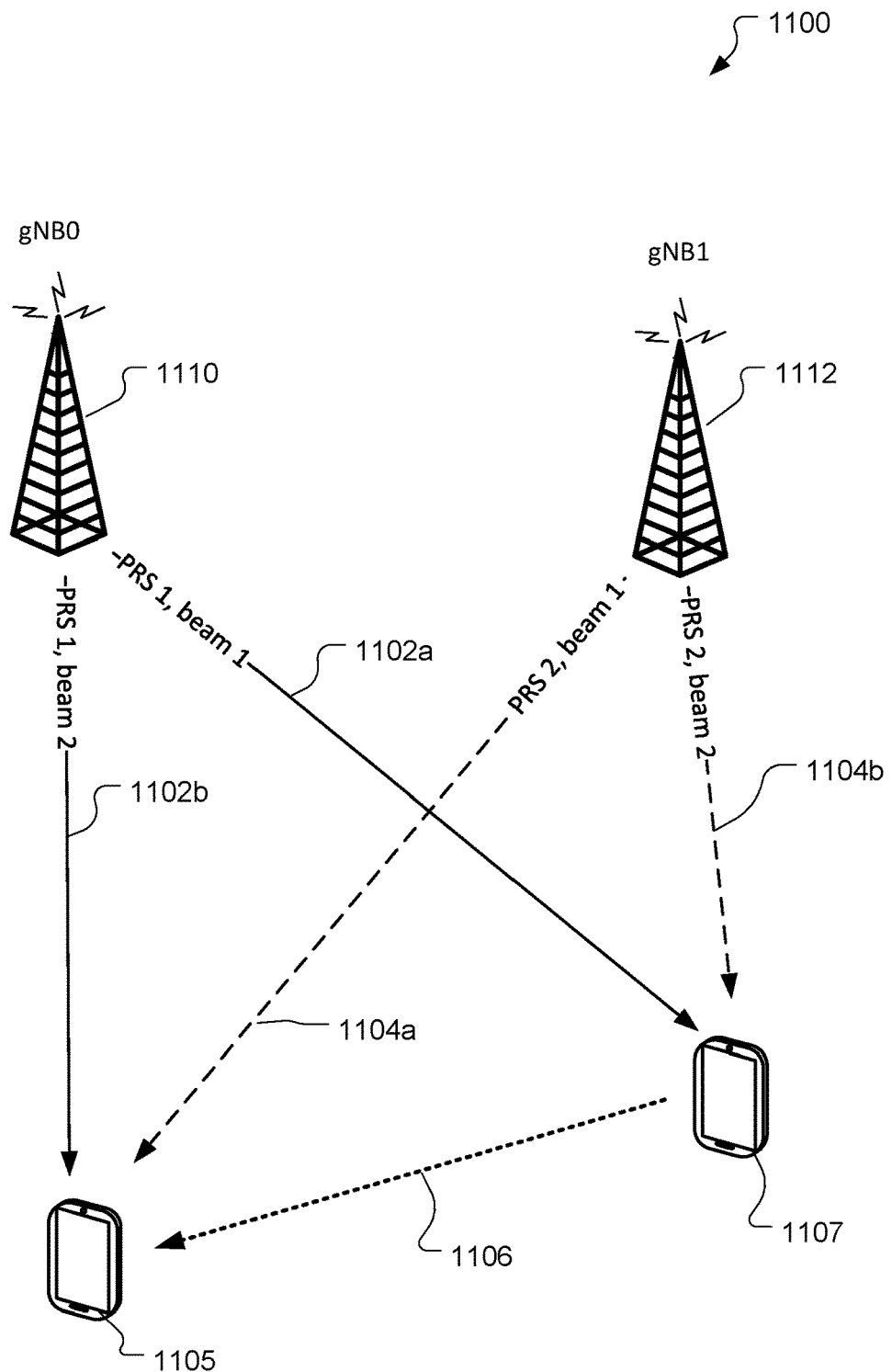
FIG. 11 is an example signaling diagram for passive positioning with beamformed positioning reference signals and sidelink assistance.

Referring to FIG. 11, with further reference to FIGS. 8 and 10, an example signaling diagram 1100 for passive positioning with beamformed positioning reference signals and sidelink assistance is shown. The diagram 1100 includes a first station 1110, a second station 1112, a target UE 1105, and a helper UE 1107. The UEs 1105, 1107 are examples of the UEs 105, 200 and the stations 1110, 1112 may be gNBs 110a-b or ng-eNBs 114, or other TRPs 300. The first station and the second station 1110, 1112 may be configured to transmit beamformed PRSs along various azimuths. The beamforming may also vary elevation angles and other beam dimensions such as beam width. The first station 1110 is configured to transmit a first PRS on a first beam 1102a, which is received by the helper UE 1107. The first station 1110 also transmits the first PRS on a second beam 1102b, which is received by the target UE 1105. The first PRS may be transmitted on additional beams (not shown in FIG. 11). Referring to FIGS. 5A and 5B, the first PRS transmissions may be based on a plurality of PRS resources such that each PRS resource is configured to transmit along a different azimuth. Similarly, the second station 1112 is configured to transmit a second PRS on a first beam 1104a, which is received by the target UE 1105. The second station 1112 also transmits the second PRS on a second beam 1104b, which is received by the helper UE 1107. The stations 1110, 1112 may provide PRS beam information including beam identification, azimuth angle, timing, sequence, PRS bandwidth, and other beam parameters to the UEs 1105, 1107 via broadcast or other signaling (e.g., RRC, SIBs, LPP, etc.). The PRS beam information may also include the time of flight and turnaround times for various station and beam combinations. The helper UE 1107 may determine a RSTD value associated with the first PRS, first beam 1102a and the second PRS, second beam 1104b, and provide the RSTD and location information to the target UE 1105 via a sidelink 1106, as previously described in FIG. 10. The target UE 1105 may determine the synchronization error associated with the first station 1110 and the second station 1112 based on the helper UE's 1107 RSTD measurement. The synchronization error may then be applied to the first PRS, second beam 1102b and the second PRS, first beam 1104a received by the target UE 1105, in combination with the beam timing and/or sequence information. The solution assumes that the synchronization error is consistent for each of the PRS beams transmitted by the stations 1110, 1112.

The helper UE 1107 may be configured to provide sidelink assistance data for various combinations of beam pairs. The beam pairs may be on the same frequency layer or different frequency layers. The PRSs 1102a-b, 1104a-b may be transmitted with different radio access technologies. For example, the first PRS could be an omnidirectional PRS (e.g., LTE, sub 6 GHz), and the second PRS could utilize beamforming technologies (e.g., 5G, mmW, etc.). The PRSs 1102a-b, 1104a-b may be configured as on-demand PRSs and may be transmitted in response to a signal received from the target UE 1105.

Figure 12:
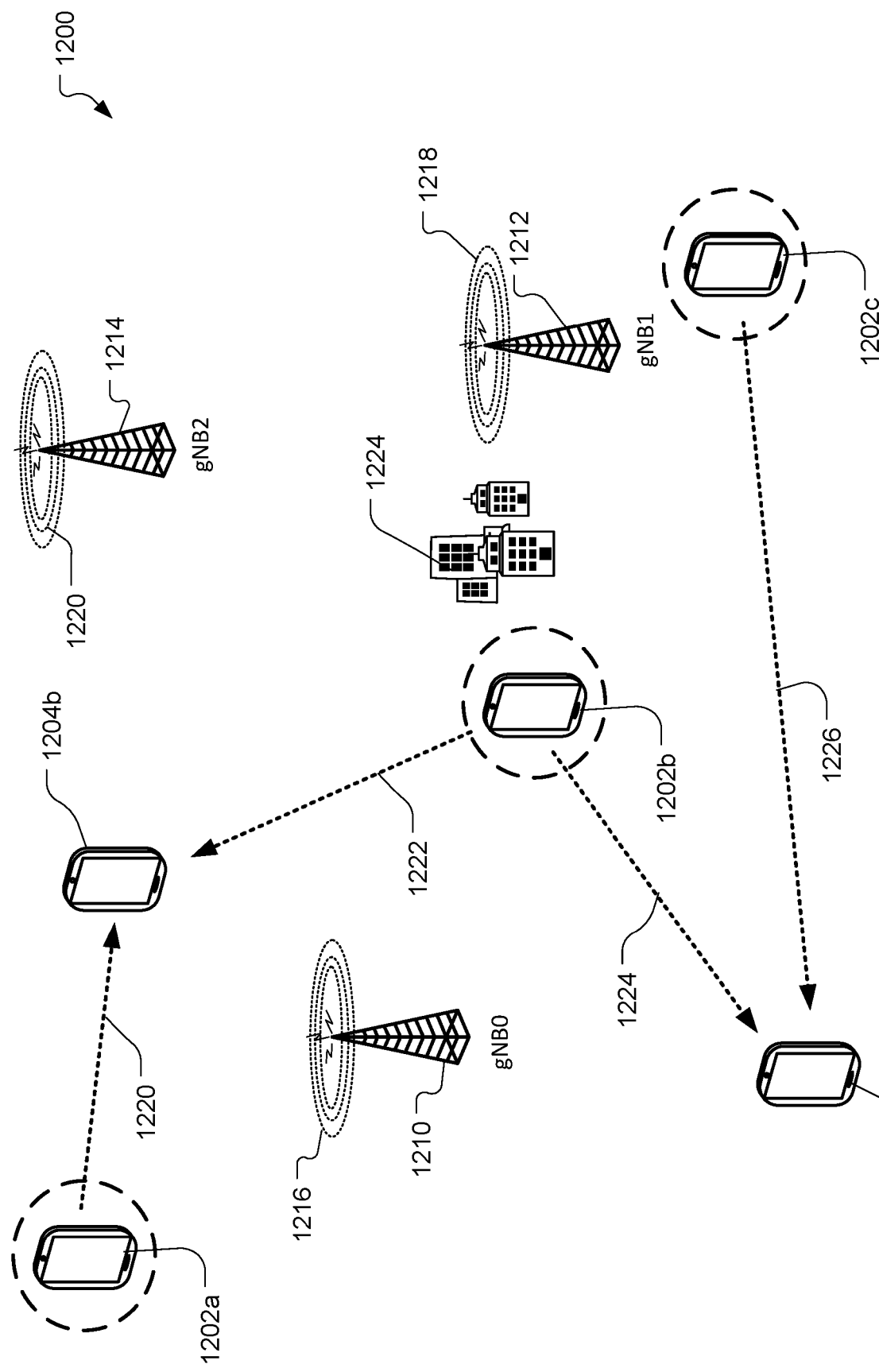
FIG. 12 is an illustration of an example network utilizing passive positioning with a plurality of sidelinks.

Referring to FIG. 12, an example network 1200 utilizing passive positioning with a plurality of sidelinks is shown. The network 1200 includes a first station 1210 configured to transmit at least a first PRS 1216, a second station 1212 configured to transmit at least a second PRS 1218, and a third station 1214 configured to transmit at least a third PRS 1220. In an example, the PRSs 1216, 1218, 1220 may be transmitted via a Uu interface. The network 1200 includes a plurality of target and helper UEs, such as a first helper UE 1202*a*, a second helper UE 1202*b*, and a third helper UE 1202*c*. The helper UEs are designated with a dashed-circle in FIG. 12. The target UEs include a first target UE 1204*a* and a second target UE 1204*b*. The locations and relative positions of the stations and UEs in the network 1200 are provided as examples. In operation, the network 1200 may include many UEs and stations in various locations to one another. Further, the line of sight (LOS) between the UEs and the stations may not be available for every UE and station combination, and the assistance data provided by some helping UEs may be more useful than assistance data provided by other helping UEs. For example, the second helper UE 1202*b* may be proximate to buildings 1224, or other obstacles which may interfere with signals transmitted from the second station 1212. The second helper UE 1202*b* may have non-line of sight (NLOS) communication paths with the second station 1212. In an embodiment, other UEs (not shown in FIG. 12) may be configured to transmit PRSs via a sidelink (e.g., PC5).

In general, the performance of passive positioning may depend on detecting the first arrival path (FAP) timing, and the quality of the PRS signals detected by the helping UEs 1202*a-c*. A helping UE with a LOS channel may generate a more accurate RSTD estimate as compared to a helper UE with a NLOS channel. For example, the first target UE 1204*a* may receive a first sidelink assistance transmission 1224 from the second helper UE 1202, and a second sidelink assistance transmission 1226 from the third helper UE 1202*c*. The first and second sidelink assistance transmission 1224, 1226 are associated with the PRS transmissions between the first station 1210 and the second station 1212. The first sidelink assistance transmission 1224 may include an indication that the RSTD is based on NLOS PRS. The first target UE 1204*a* may then select the second sidelink assistance transmission 1226 from the third helper UE 1202*c*, which is based on LOS PRS with the first and second stations 1210, 1212.

The RSTD values determined by the helper UEs may be based on prior PRS transmissions from various pairs of stations. In an embodiment, a helper UE may include a time stamp with the RSTD estimate and provide the timestamp information to a target UE with the sidelink assistance data. For example, the first helper UE 1202*a* and the second helper UE 1202*b* may determine RSTD values associated with PRS transmitted from the first station 1210 and the third station 1214. In an example, the second helper UE 1202*b* may determine RSTD values at a first time, and the first helper UE 1202*a* may determine RSTD values at a second time, which is after the first time. The second target UE 1204*b* may receive sidelink assistance transmissions 1221, 1222 from the respective first and second helper UEs 1202*a*, 1202*b*. The target UE 1204*b* may utilize the RSTD values in the received sidelink assistance transmission with the most current timestamp.

In an embodiment, the helper UEs may be configured to determine signal strength measurements for the received PRS transmissions. For example, RSRP and/or RSRQ values may be associated with the RSTD measurements. The signal strength measurements may be provided to a target UE, and the target UE may be configured to select a RSTD measurement based on the signal strength. The RSRP strength may indicate the quality of the RSTD estimate the helping UEs provide to the target UEs. The target UEs may be configured to decide how to utilize the assistance information from the helping UEs based on LOS probability, the PRS time stamp as well as RSRP strength associated with the helping UE's RSTD estimates, or combinations of these values.

In an embodiment, a network resource such as the LMF 120 may maintain location and capability information for the helping UEs 1202*a-c*. The stations 1210, 1212, 1214, or other network devices, may provide the target UEs 1204*a-b* with location and capability information associated with the helper UEs 1202*a-c*. The target UEs 1204*a-b* may utilize the sidelink assistance data provided by proximate helper UEs 1202*a-c*.

In an example, the network (e.g., LMF 120 or other network resources) may determine which helper UEs 1202*a-c* are available to provide sidelink assistance data. These helper UEs may be selected based on, for example, location, LOS probability, network link quality, capabilities, system state (e.g., power available, active status, etc.), connection status, or other factors. In an example, the network may be configured to provide activation times and durations to enable helper UEs to transition from an idle or inactive state to an active state to provide sidelink assistance data. The target UEs may also be configured to receive sidelink assistance data while in idle/inactive states. For example, the network may provide receive period information via one or more System Information Blocks (SIBs), or other network messages, including periods for transmitting and receiving sidelink assistance data. Target UEs 1204*a-b* may be configured to measure the signal quality/RSSI/RSRP of the neighboring helping UEs 1202*a-c* and use the assistance data with higher quality neighbor measurements. In an example, the RSTD and measurement information obtained by the helper UEs 1202*a-c* may be provided to the network (e.g., the LMF 120), and subsequently provided to the target UEs 1204*a-b* via network signaling (e.g., broadcast, RRC, LPP, etc.).

In an embodiment, the helper UEs 1202*a* may be configured to determine timing synchronization errors for pairs of stations 1210, 1212, 1214 and provide the timing synchronization error values rather than the RSTD values to the target UEs. The timing synchronization error values may require fewer resources to transmit as compared to the RSTD values, and thus may reduce the traffic overhead for transmitting the assistance data. In an example the helping UEs 1202*a-c* may provide the assistance data to stations 1210, 1212, 1214 which may be configured to determine the timing synchronization error between each pair of stations and provide the timing synchronization errors to the target UEs 1204*a-b*.

In an embodiment, one or more UEs may be in a fixed location and configured to perform some or all of the functions of the stations described herein. For example, a UE may be configured to determine a location (e.g., using inertial, satellite and/or terrestrial techniques) and transmit positioning reference signals to neighboring base stations and/or UEs. The UEs in a network may be configured to transmit omnidirectional sounding reference signals (SRS) for positioning and/or beamformed SRS for positioning based on the capabilities of the network and/or the UE. For example, UEs configured for 5G sub 6 GHz operations may utilize omnidirectional signaling, and UEs configured for higher frequencies may utilize analog beamforming. The UE may transmit SRS for positioning with existing uplink and sidelink communication interfaces such as Uu and PC5, for example.

Figure 13:
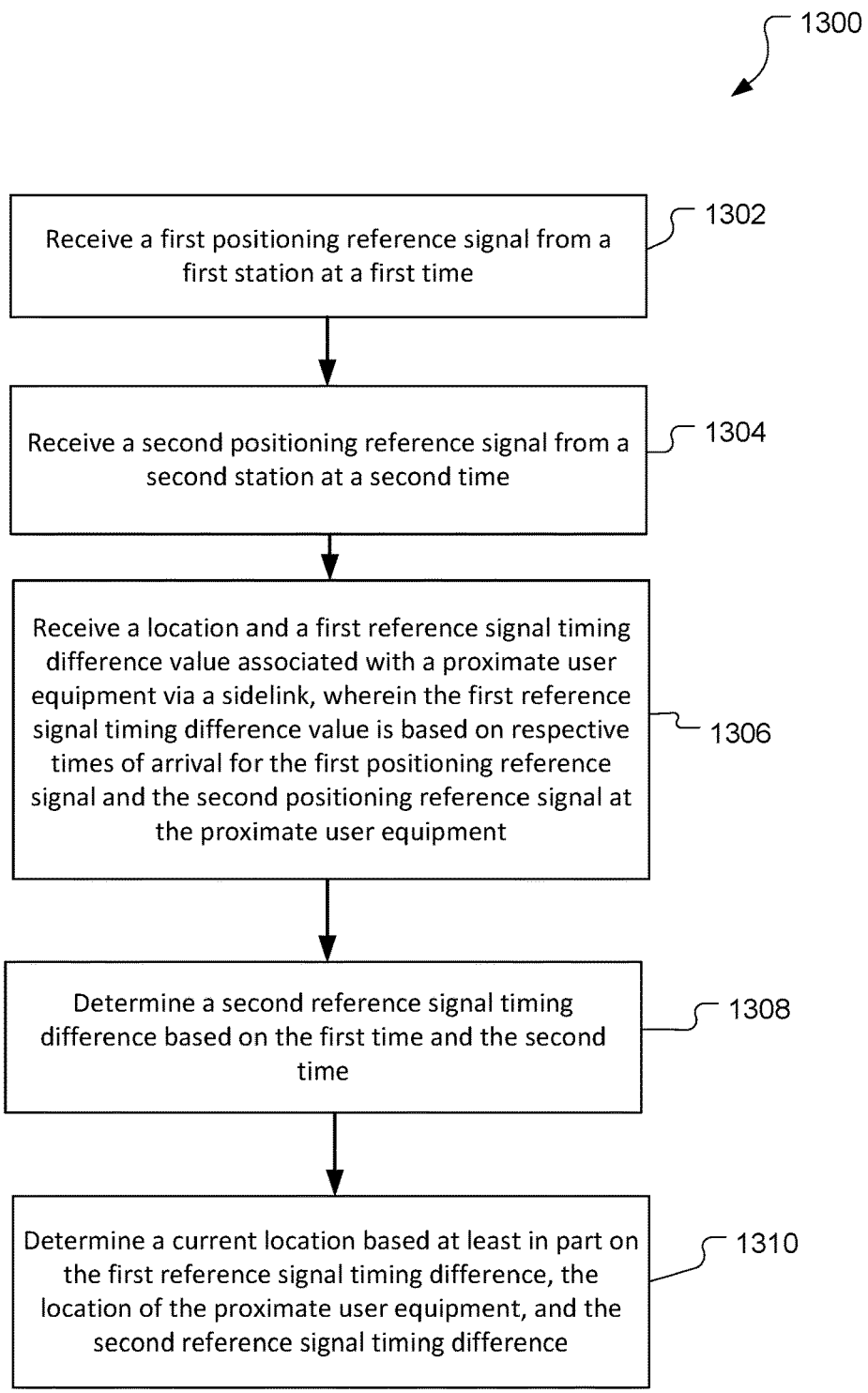
FIG. 13 is a process flow of an example method for positioning a user equipment with sidelink assistance.

Referring to FIG. 13, with further reference to FIGS. 1-12, a method 1300 for positioning a user equipment with sidelink assistance includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes receiving a first positioning reference signal from a first station at a first time. The UE 200, including the transceiver 215 and the processor 230, is a means for receiving the first PRS. In an example, referring to FIG. 10, a TRP 300, such as a first station 1010 is configured to transmit a first PRS 1002. The first PRS may be an omnidirectional transmission or beamformed transmission as depicted in FIG. 11. The first PRS 1002 may be based on a PRS resource set stored at the first station 1010 or at another network resource, such as the LMF 120. The UE 1005 may receive the first PRS 1002 in response to a positioning request from the network. In an example, the transmission of the first PRS 1002 may be preceded by a passive positioning start message 802 or other network signaling, such as a positioning SIB. The UE 1005 may be configured to select a DL PRS based on established PRS scheduling information. In an example, the first PRS may be a user or group specific on-demand PRS. A second UE, such as the helper UE 1007, also receives the PRS 1002 or other PRSs transmitted by the first station. For example, the second UE may receive previous PRS transmissions from the first station, or beamformed PRSs transmitted from the first station.

At stage 1304, the method includes receiving a second positioning reference signal from a second station at a second time. The UE 200, including the transceiver 215 and the processor 230, is a means for receiving the second PRS. In an example, a second TRP 300, such as the second station 1012 is configured to send a second PRS 1004, which is received by the UE 1005. The UE may be configured to select the second PRS 1004 based on established PRS scheduling information. In an embodiment, the first and second PRSs may be on the same frequency layer or on different frequency layers, and may utilize different technologies (e.g., LTE and 5G NR for dynamic spectrum sharing). The second PRS 1004 may also be received by the second UE (e.g., the helper UE 1007). The second UE may also be configured to receive previous PRS transmissions from the second station, or beamformed PRS transmitted from the second station.

At stage 1306, the method includes receiving a location and a first reference signal timing difference value associated with a proximate user equipment via a sidelink, wherein the first reference signal timing difference value is based on respective times of arrival for the first positioning reference signal and the second positioning reference signal at the proximate user equipment. The UE 200, including the transceiver 215 and the processor 230, is a means for receiving the location and the first reference signal timing difference value. In an example, a second UE such as the helper UE 1007 may receive the first and second PRS 1002, 1004 and determine a corresponding arrival time difference of the two PRSs. The second UE is in a known location and thus the distances to the first station 1010 and to the second station 1012 are known. The second UE determines the RSTD for the first and second PRS 1002, 1004 and sends the RSTD and location information via a sidelink transmission 1006. The RSTD information determined by a helper UE is an example of the first reference signal timing difference value. The sidelink transmission 1006 may utilize a sidelink physical layer structure and corresponding numerologies. For example, in 5G NR the sidelink transmission may utilize a physical sidelink control channel (PSCCH), a physical sidelink shared channel (PSSCH), physical sidelink broadcast channel (PSBCH), etc. A V2X use case may utilize the PC5 interface. In an example, helper UEs may be configured to provide location and RSTD measurement information to the network, and a target UE may receive the location and RSTD information associated with a helper UE from the network (e.g., via network signaling from a serving station).

At stage 1308, the method includes determining a second reference signal timing difference based at least in part on the first time and the second time. The UE 200, including the processor 230, is a means for determining the second reference signal timing difference. In an example, the UE 200 may receive turnaround time and time of flight information associated with the first and second PRS transmissions 1002, 1004 from the stations 1010, 1012, serving station, or other network resources (e.g., the LMF 120) to perform RSTD measurements. The received turnaround time may include errors based on transmit and receive delays, and other group delays, at the stations 1010, 1012. The target UE 1005 is configured to utilize the location and first reference signal timing difference value received at stage 1306 to improve the accuracy of the RSTD measurements.

At stage 1310, the method includes determining a current location based at least in part on the first reference signal timing difference, the location of the proximate user equipment, and the second reference signal timing difference. The UE 200, including the processor 230, is a means for determining a current location. In an example, the target UE 1005 is configured to utilize the RSTD and location of the helper UE 1007, and the locations of the first and second stations 1010, 1012 to mitigate the synchronization errors between the stations. The time of flight between the stations 1010, 1012 (i.e., T2-T1 on FIG. 8) is known based on the locations of the respective antennas. The turnaround time (i.e., T4-T2 on FIG. 8) is known because the respective distances between the helper UE 1007 and the stations 1010, 1012 are known. Thus, the first reference signal timing difference value observed on the helper UE 1007 and received at stage 1306 removes the error of the station timing which may deviate from previously provided assistance data. The first reference signal timing difference is observed on a helper UE and is based on the actual transmissions of the first and second PRSs 1004, 1006 and not the expected turnaround time contained in the assistance data (e.g., as depicted in FIG. 9). The target UE 1005 may utilize the first reference signal timing difference value received at stage 1306, and the second reference signal timing difference measured at stage 1308, and the location information to improve the accuracy of the distance computations provided in equations (2)-(4) associated with the first and second stations 1010, 1012. In an example, the first reference signal timing difference value may be based on prior PRS transmissions from the first and second stations 1010, 1012 and may be used at stage 1310 with an assumption the synchronization errors are relatively constant over a defined period of time. In an example, the UE 1005 may receive location and RSTD information from a plurality of proximate UEs. The UE 1005 may be configured to utilize the location and RSTD information based on the relative signal qualities of the PRS transmissions as observed by the plurality of helper UEs. For example, LOS, timestamp information (e.g., age), and signal strengths of the observed PRS transmissions may be used by a target UE to select which received RSTD data to use for positioning.

In an embodiment, the functions of the stations in the method 1300 may be performed by a helper UE. For example, UL PRS and device-to-device sidelinks (e.g., PC5) may be used to provide PRS or other reference signals such as SRS for positioning. Other interfaces, such as the Uu interface, may be used to transmit one or more PRSs.

Figure 14:
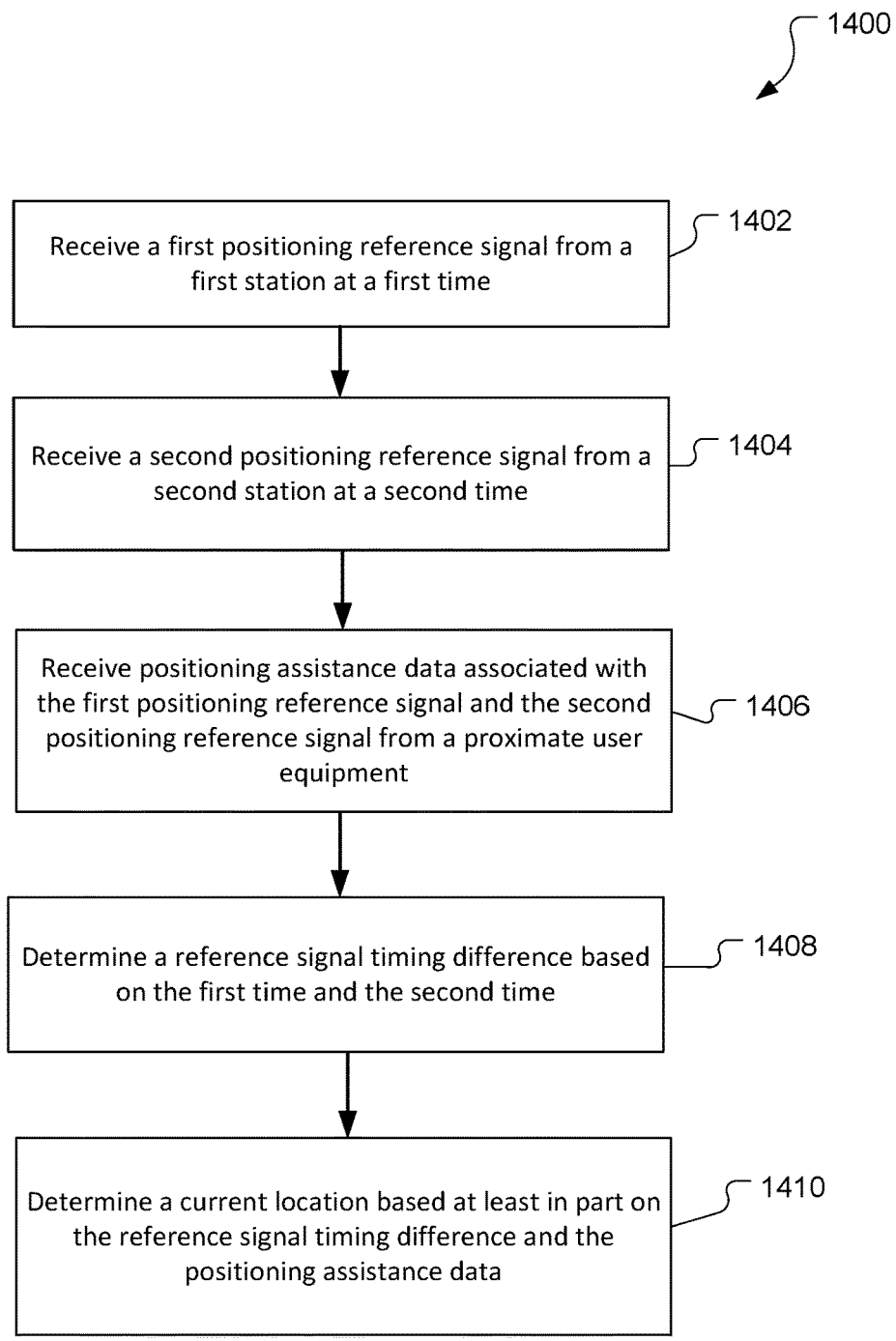
FIG. 14 is a process flow of an example method for passive positioning of a user equipment.

Referring to FIG. 14, with further reference to FIGS. 1-12, a method 1400 for positioning a user equipment includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving a first positioning reference signal from a first station at a first time. The UE 200, including the transceiver 215 and the processor 230, is a means for receiving the first PRS. In an example, referring to FIG. 11, a TRP 300, such as a first station 1110 is configured to transmit a first PRS on a first beam 1102*a*, and on a second beam 1102*b*. The first PRS beams 1102*a*-*b* may be based on PRS resources stored at the first station 1110 or at another network resource, such as the LMF 120. The UE 1105 may receive the first PRS, second beam 1102*b* in response to a positioning request from the network. The UE 1105 may be configured to select a PRS beam based on established PRS scheduling information. In an example, the first PRS beams 1102*a*-*b* may be a user or group specific on-demand PRS. A second UE, such as the helper UE 1107, receives the first PRS first beams 1102*a*, or other PRS beams transmitted by the first station 1110. For example, the second UE may receive previous beamformed PRS transmissions from the first station 1110.

At stage 1404, the method includes receiving a second positioning reference signal from a second station at a second time. The UE 200, including the transceiver 215 and the processor 230, is a means for receiving the second PRS. In an example, a second TRP 300, such as the second station 1112 is configured to send a second PRS first beam 1104*a*, which is received by the UE 1005. The UE may be configured to select a second PRS beam based on established PRS scheduling information. In an embodiment, the first and second stations 1110, 1112 may be configured to operate on the same frequency layer or on different frequency layers, and may utilize different technologies (e.g., LTE and 5G NR for dynamic spectrum sharing). The second PRS second beam 1104*b* may be received by the second UE (e.g., the helper UE 1007). The second UE may also be configured receive previous PRS transmissions from the second station.

At stage 1406, the method includes receiving positioning assistance data associated with positioning reference signals received by a proximate user equipment. The UE 200, including the transceiver 215 and the processor 230, is a means for receiving the positioning assistance data. In an example, a second UE such as the helper UE 1107 may receive the respective first and second PRS beams 1102*a*, 1104*b* from the first and second stations 1110, 1112 and determine a corresponding arrival time difference of the two PRS beams. The second UE is in a known location and thus the distances to the first station 1110 and to the second station 1112 are known. The second UE determines the RSTD for the respective beams 1102*a*, 1104*b* and sends the RSTD and location information via a sidelink transmission 1106. The RSTD information determined by a helper UE is an example of positioning assistance data associated with PRS received by a proximate UE. The sidelink transmission 1106 may utilize a sidelink physical layer structure and corresponding numerologies. For example, in 5G NR the sidelink transmission may utilize the PSCCH, PSSCH, PSBCH, etc. A V2X use case may utilize the PC5 interface. In an example, helper UEs may be configured to provide positioning assistance information to the network, and a target UE may receive the positioning assistance information associated with a helper UE from the network (e.g., via network signaling from a serving station).

At stage 1408, the method includes determining a reference signal timing difference based at least in part on the first time and the second time. The UE 200, including the processor 230, is a means for determining the reference signal timing difference. In an example, the UE 200 may receive turnaround time and time of flight information associated with the respective beams 1102*b*, 1104*a* transmitted from stations 1110, 1112. Referring to FIGS. 5A and 5B, the PRS resources (i.e., beams) may be transmitted on a predetermined schedule, such that the slot times associated with the PRS resource sets 502, 504. The known time intervals between PRS beam transmissions may be used in the RSTD distance computations. For example, the time interval between the first PRS first beam 1102*a* and the second beam 1120*b* may be a fixed value, and the timing interval between the second PRS first beam 1104*a* and the second beam 1104*b* may be another fixed value. The time values associated with the PRS beams may be provided by the network to UEs via assistance data transmissions (e.g., RRC, LLP, broadcast messages, etc.). The target UE 1105 is configured to utilize the network assistance data, and the assistance data received by proximate UEs at stage 1406, to improve the accuracy of the RSTD measurements. For example, the assistance data received from the proximate UEs may include a location of the proximate UE, PRS beam identification information (e.g., PRS-ID), station identification information, and the observed arrival time difference of the PRS transmissions. In an example, the assistance data received from the proximate UE may be a synchronization error associated with the stations and/or the particular PRS beams. Station pairs may have a synchronization error which may be applied to beams transmitted by the stations. In an example, synchronization errors may be computed for individual beam pairs. Providing the synchronization error results as the positioning assistance data may conserve bandwidth as compared to sending RSTD measurement values.

At stage 1410, the method includes determining a current location based at least in part on the reference signal timing difference and the positioning assistance data. The UE 200, including the processor 230, is a means for determining a current location. In an example, the target UE 1105 is configured to utilize the positioning assistance data received from the helper UE 1107, PRS resource transmission times, and the locations of the first and second stations 1110, 1112 to mitigate the synchronization errors between the stations. The time of flight between the stations 1110, 1112 (i.e., T2-T1 on FIG. 8) is known based on the locations of the respective antennas. The PRS beam transmission schedule and turnaround time (i.e., T4-T2 on FIG. 8) may be known because the respective distances between the helper UE 1107 and the stations 1110, 1112, and the PRS resource transmission schedules are known. Thus, the positioning assistance data determined by the proximate UE and received at stage 1406 removes the error of the station timing which may deviate from previously provided assistance data. The target UE 1105 may utilize the positioning assistance data, the reference signal timing difference measured at stage 1408, and the network provided assistance data to improve the accuracy of the distance computations provided in equations (2)-(4) associated with the first and second stations 1110, 1112. In an example, the positioning assistance data measured or computed by the proximate UE may be based on prior PRS transmissions from the first and second stations 1110, 1112 and may be used at stage 1410 with an assumption the synchronization errors are relatively constant over a defined period of time. In an example, the UE 1105 may receive positioning assistance data from a plurality of proximate UEs. The UE 1105 may be configured to select positioning assistance data based on the relative signal qualities of the PRS transmissions as observed by the plurality of helper UEs. For example, LOS probability, timestamps, and signal strengths of the observed PRS transmissions may be used by a target UE to select which received positioning assistance data to use for positioning the target UE.

In an embodiment, the functions of the stations in the method 1400 may be performed by a helper UE. For example, UL PRS and D2D sidelinks may be used to provide PRS or other reference signals such as SRS for positioning. Other interfaces, such as the Uu interface, may be used to transmit one or more PRSs.

Figure 15:
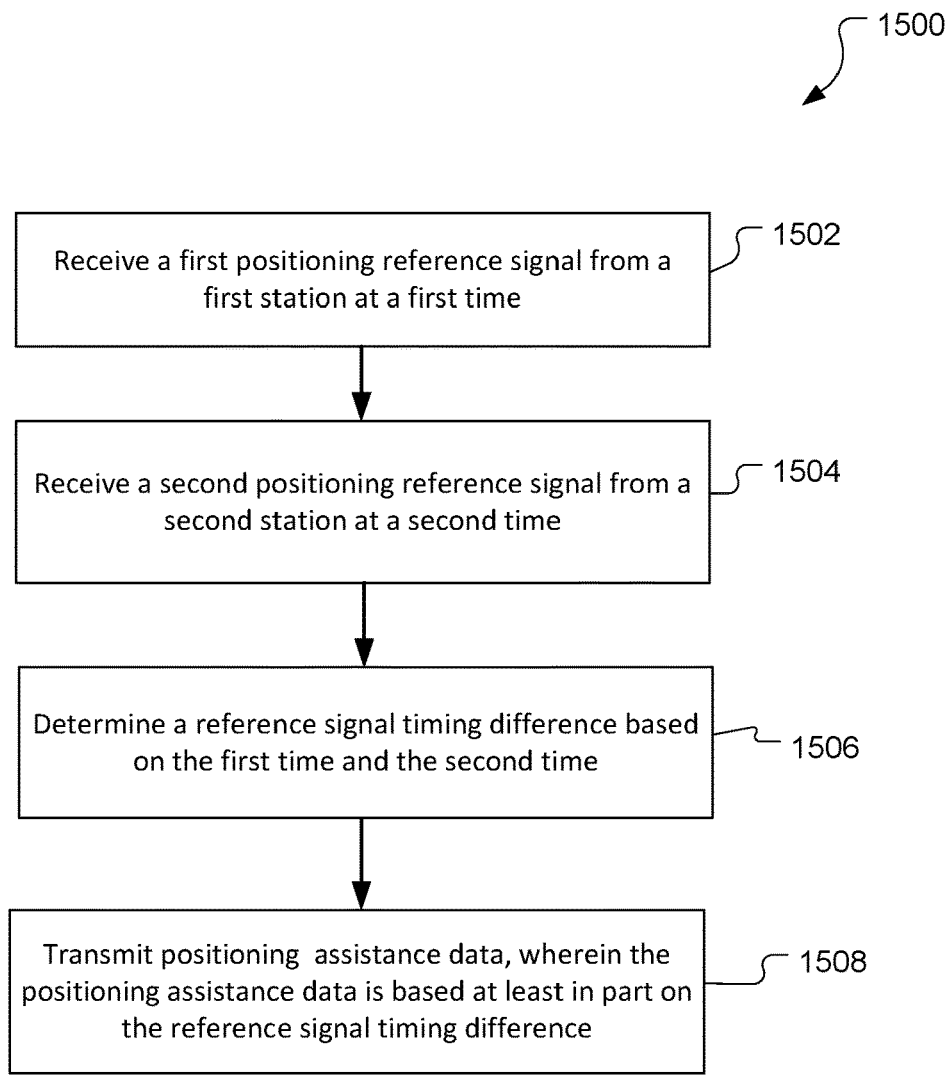
FIG. 15 is a process flow of an example method for providing positioning assistance data based on received positioning reference signals.

Referring to FIG. 15, with further reference to FIGS. 1-14, a method 1500 for providing positioning assistance data based on received positioning reference signals includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes receiving a first positioning reference signal from a first station at a first time. The UE 200, including the transceiver 215 and the processor 230, is a means for receiving the first PRS. In an example, referring to FIG. 12, a TRP 300, such as a first station 1210 is configured to transmit a first PRS 1216 as an omnidirectional signal or as one or more beamformed PRS resources. A helper UE, such as the helper UE 1202*a* may receive the first PRS 1216 at a first time.

At stage 1504, the method includes receiving a second positioning reference signal from a second station at a second time. The UE 200, including the transceiver 215 and the processor 230, is a means for receiving the second PRS. In an example, a second TRP 300, such as the second station 1212 is configured to send a second PRS 1218 as an omnidirectional signal or as one or more beamformed PRS resources. The helper UE 1202*a* may receive the second PRS 1218 at a second time. In an embodiment, the first and second stations 1210, 1212 may be configured to operate on the same frequency layer or on different frequency layers, and may utilize different technologies (e.g., LTE and 5G NR for dynamic spectrum sharing).

At stage 1506, the method includes determining a reference signal timing difference based at least in part on the first time and the second time. The UE 200, including the processor 230, is a means for determining the second reference signal timing difference. In an example, the helper UE 1202*a* may receive assistance data including turnaround time(s) and time of flight information associated with the first and second station 1210, 1212 and respective PRS resources. The assistance data may be included in network messaging such as RRC, SIBS, LPP, etc. The helper UE 1202*a* may receive the first and second PRS 1216, 1218 and determine a corresponding arrival time difference of the two PRSs. The helper UE 1202*a* is at a known location and thus the distances to the first station 1210 and to the second station 1212 are known. The helper UE 1202*a* is configured to determine the RSTD for the first and second PRS 1216, 1218 and the corresponding first and second times. In an example, the helper UE 1202*a* may determine timestamp information (e.g., based on a network time) for the first and second PRS 1216, 1218. Other signal and performance parameters such as LOS probability, and signal strength may also be associated with the received PRS signals.

At stage 1508, the method includes transmitting positioning assistance data, wherein the positioning assistance data is based at least in part on the reference signal timing difference. The UE 200, including the transceiver 215 and the processor 230, is a means for transmitting the assistance data. In an example, the helper UE 1202*a* may utilize the RSTD values and a current location as assistance data. The helper UE 1202*a* may be configured to determine a synchronization error associated with the first and second stations 1210, 1212 and use the resulting synchronization error as the assistance data. For example, the helper UE 1202 may utilize the known locations of the stations 1210, 1212 and of the helper UE 1202*a* to determine the ideal RSTD values and compute the synchronization errors as the difference between the ideal RSTD values and the observed RSTD values. In an example, the helper UE 1202*a* may provide the first time and the second time, and current location coordinates (if needed) to the network, and a network resource (e.g., the LMF 120) may be configured to determine RSTD values and/or the synchronization error. In an example, the helper UE 1202*a* may use a sidelink transmission 1221 to provide the assistance data to proximate target UEs, such as the second target UE 1204*b*. The sidelink transmission 1221 may utilize a sidelink physical layer structure and corresponding numerologies. For example, in 5G NR the sidelink transmission may utilize PSCCH, PSSCH, PSBCH, etc. Other sidelink interfaces may also be used. In an example, the helper UE 1202*a* may transmit the assistance data to the network via a Uu interface, or other network signaling, and a network resource (e.g., LMF 120, or other server 400) may be configured to provide the assistance data to one or more target UEs. The LMF 120 may be configured to selectively distribute assistance data received from helper UEs based on location or other operational parameters associated with the measured PRS. For example, the LMF 120 may utilize LOS criteria, signal strength indications, and measurement timing as operational parameters. Other PRS beam parameters may also be used to improve the quality of the RSTD and/or synchronization error values provided to the target UEs.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for passive positioning, comprising:
receiving a first positioning reference signal from a first station at a first time;
receiving a second positioning reference signal from a second station at a second time;
receiving positioning assistance data associated with positioning reference signals received by a proximate user equipment;
determining a reference signal timing difference based at least in part on the first time and the second time; and
determining a current location based at least in part on the reference signal timing difference and the positioning assistance data.

2. The method of clause 1 wherein the positioning assistance data is received from the proximate user equipment via a sidelink.

3. The method of clause 1 wherein the positioning assistance data is received from a serving station.

4. The method of clause 1 wherein the positioning assistance data includes a signal strength parameter associated with the positioning reference signals received by the proximate user equipment.

5. The method of clause 1 wherein the positioning reference signals received by the proximate user equipment are the first positioning reference signal and the second positioning reference signal.

6. The method of clause 1 wherein the positioning reference signals received by the proximate user equipment are a first beamformed positioning reference signal transmitted from the first station, and a second beamformed positioning reference signal transmitted from the second station.

7. The method of clause 1 wherein at least one of the positioning reference signals received by the proximate user equipment is received at a different time compared to a transmission time of at least one of the first positioning reference signal and the second positioning reference signal.

8. The method of clause 1 wherein the positioning assistance data is a second reference signal timing difference value based at least on part on the positioning reference signals received by the proximate user equipment.

9. The method of clause 1 wherein the positioning assistance data is a synchronization error value based at least on part on the positioning reference signals received by the proximate user equipment.

10. The method of clause 1 further comprising receiving a receive period information indicating a time period the positioning assistance data is transmitted.

11. A method for providing positioning assistance data, comprising:
receiving a first positioning reference signal from a first station at a first time;
receiving a second positioning reference signal from a second station at a second time;
determining a reference signal timing difference based at least in part on the first time and the second time; and
transmitting positioning assistance data, wherein the positioning assistance data is based at least in part on the reference signal timing difference.

12. The method of clause 11 wherein the positioning assistance data is transmitted to a proximate user equipment via a sidelink.

13. The method of clause 11 wherein the positioning assistance data is transmitted to a serving station.

14. The method of clause 11 further comprising determining a signal strength parameter associated with at least one of the first positioning reference signal and the second positioning reference signal.

15. The method of clause 11 wherein at least one of the first positioning reference signal and the second positioning reference signal is an omnidirectional positioning reference signal.

16. The method of clause 11 wherein at least one of the first positioning reference signal and the second positioning reference signal is an beamformed positioning reference signal.

17. The method of clause 11 wherein the positioning assistance data is the reference signal timing difference.

18. The method of clause 11 wherein the positioning assistance data is a synchronization error value based at least on part on the first positioning reference signal and the second positioning reference signal.

19. The method of clause 11 further comprising receiving a transmit period information indicating a time period to transmit the positioning assistance data.

20. The method of clause 19 wherein the positioning assistance data is transmitted during the transmit period via a sidelink.

21. The method of clause 11 wherein the first positioning reference signal and the second positioning reference signal utilize different frequency layers.

22. A user equipment (UE), comprising:
a memory;
at least one transceiver;
at least one processor communicatively coupled the memory and the at least one transceiver and configured to:
receive a first positioning reference signal from a first station at a first time;
receive a second positioning reference signal from a second station at a second time;
receive positioning assistance data associated with positioning reference signals received by a proximate user equipment;
determine a reference signal timing difference based at least in part on the first time and the second time; and
determine a current location based at least in part on the reference signal timing difference and the positioning assistance data.

23. The user equipment of clause 22 wherein the positioning assistance data is received from the proximate user equipment via a sidelink.

24. The user equipment of clause 22 wherein the positioning assistance data is received from a serving station.

25. The user equipment of clause 22 wherein the positioning assistance data includes a signal strength parameter associated with the positioning reference signals received by the proximate user equipment.

26. The user equipment of clause 22 wherein the positioning reference signals received by the proximate user equipment are the first positioning reference signal and the second positioning reference signal.

27. The user equipment of clause 22 wherein the positioning reference signals received by the proximate user equipment are a first beamformed positioning reference signal transmitted from the first station, and a second beamformed positioning reference signal transmitted from the second station.

28. The user equipment of clause 22 wherein at least one of the positioning reference signals received by the proximate user equipment is received at a different time compared to a transmission time of at least one of the first positioning reference signal and the second positioning reference signal.

29. The user equipment of clause 22 wherein the positioning assistance data is a second reference signal timing difference value based at least on part on the positioning reference signals received by the proximate user equipment.

30. The user equipment of clause 22 wherein the positioning assistance data is a synchronization error value based at least on part on the positioning reference signals received by the proximate user equipment.

31. The user equipment of clause 22 wherein the at least one processor is further configured to receive a receive period information indicating a time period the positioning assistance data is transmitted.

32. A user equipment (UE), comprising:
a memory;
at least one transceiver;
at least one processor communicatively coupled the memory and the at least one transceiver and configured to:
receive a first positioning reference signal from a first station at a first time;
receive a second positioning reference signal from a second station at a second time;
determine a reference signal timing difference based at least in part on the first time and the second time; and
transmit positioning assistance data, wherein the positioning assistance data is based at least in part on the reference signal timing difference.

33. The user equipment of clause 32 wherein the positioning assistance data is transmitted to a proximate user equipment via a sidelink.

34. The user equipment of clause 32 wherein the positioning assistance data is transmitted to a serving station.

35. The user equipment of clause 32 wherein the at least one processor is further configured to determine a signal strength parameter associated with at least one of the first positioning reference signal and the second positioning reference signal.

36. The user equipment of clause 32 wherein at least one of the first positioning reference signal and the second positioning reference signal is an omnidirectional positioning reference signal.

37. The user equipment of clause 32 wherein at least one of the first positioning reference signal and the second positioning reference signal is an beamformed positioning reference signal.

38. The user equipment of clause 32 wherein the positioning assistance data is the reference signal timing difference.

39. The user equipment of clause 32 wherein the positioning assistance data is a synchronization error value based at least on part on the first positioning reference signal and the second positioning reference signal.

40. The user equipment of clause 32 wherein the at least one processor is further configured to receive transmit period information indicating a time period to transmit the positioning assistance data.

41. The user equipment of clause 40 wherein the positioning assistance data is transmitted during the transmit period via a sidelink.

42. The user equipment of clause 32 wherein the first positioning reference signal and the second positioning reference signal utilize different frequency layers.

43. An apparatus, comprising:
means for receiving a first positioning reference signal from a first station at a first time;
means for receiving a second positioning reference signal from a second station at a second time;
means for receiving positioning assistance data associated with positioning reference signals received by a proximate user equipment;
means for determining a reference signal timing difference based at least in part on the first time and the second time; and
means for determining a current location based at least in part on the reference signal timing difference and the positioning assistance data.

44. An apparatus, comprising:
means for receiving a first positioning reference signal from a first station at a first time;
means for receiving a second positioning reference signal from a second station at a second time;
means for determining a reference signal timing difference based at least in part on the first time and the second time; and
means for transmitting positioning assistance data, wherein the positioning assistance data is based at least in part on the reference signal timing difference.

45. A non-transitory processor-readable storage medium comprising processor-readable instructions configured to cause one or more processors to determine a current location, comprising:
code for receiving a first positioning reference signal from a first station at a first time;
code for receiving a second positioning reference signal from a second station at a second time;
code for receiving positioning assistance data associated with positioning reference signals received by a proximate user equipment;
code for determining a reference signal timing difference based at least in part on the first time and the second time; and
code for determining the current location based at least in part on the reference signal timing difference and the positioning assistance data.

46. A non-transitory processor-readable storage medium comprising processor-readable instructions configured to cause one or more processors to provide positioning assistance data, comprising:
code for receiving a first positioning reference signal from a first station at a first time;
code for receiving a second positioning reference signal from a second station at a second time;
code for determining a reference signal timing difference based at least in part on the first time and the second time; and
code for transmitting positioning assistance data, wherein the positioning assistance data is based at least in part on the reference signal timing difference.

The invention claimed is:

1. A method for passive positioning, comprising:
receiving a first positioning reference signal from a first station at a first time;
receiving a second positioning reference signal from a second station at a second time;
receiving positioning assistance data associated with positioning reference signals received by a proximate user equipment;
determining a reference signal timing difference based at least in part on the first time and the second time; and
determining a current location based at least in part on the reference signal timing difference and the positioning assistance data.

2. The method of claim 1 wherein the positioning assistance data is received from the proximate user equipment via a sidelink.

3. The method of claim 1 wherein the positioning assistance data is received from a serving station.

4. The method of claim 1 wherein the positioning assistance data includes a signal strength parameter associated with the positioning reference signals received by the proximate user equipment.

5. The method of claim 1 wherein the positioning reference signals received by the proximate user equipment are the first positioning reference signal and the second positioning reference signal.

6. The method of claim 1 wherein the positioning reference signals received by the proximate user equipment are a first beamformed positioning reference signal transmitted from the first station, and a second beamformed positioning reference signal transmitted from the second station.

7. The method of claim 1 wherein at least one of the positioning reference signals received by the proximate user equipment is received at a different time compared to a transmission time of at least one of the first positioning reference signal and the second positioning reference signal.

8. The method of claim 1 wherein the positioning assistance data is a second reference signal timing difference value based at least on part on the positioning reference signals received by the proximate user equipment.

9. The method of claim 1 wherein the positioning assistance data is a synchronization error value based at least on part on the positioning reference signals received by the proximate user equipment.

10. The method of claim 1 further comprising receiving a receive period information indicating a time period the positioning assistance data is transmitted.

11. A method for providing positioning assistance data, comprising:
receiving a first positioning reference signal from a first station at a first time;
receiving a second positioning reference signal from a second station at a second time;
determining a reference signal timing difference based at least in part on the first time and the second time; and
transmitting positioning assistance, wherein the positioning assistance data is based at least in part on the reference signal timing difference.

12. The method of claim 11 wherein the positioning assistance data is transmitted to a proximate user equipment via a sidelink.

13. The method of claim 11 wherein the positioning assistance data is transmitted to a serving station.

14. The method of claim 11 further comprising determining a signal strength parameter associated with at least one of the first positioning reference signal and the second positioning reference signal.

15. The method of claim 11 wherein at least one of the first positioning reference signal and the second positioning reference signal is an omnidirectional positioning reference signal.

16. The method of claim 11 wherein at least one of the first positioning reference signal and the second positioning reference signal is an beamformed positioning reference signal.

17. The method of claim 11 wherein the positioning assistance data is the reference signal timing difference.

18. The method of claim 11 wherein the positioning assistance data is a synchronization error value based at least on part on the first positioning reference signal and the second positioning reference signal.

19. The method of claim 11 further comprising receiving a transmit period information indicating a time period to transmit the positioning assistance data.

20. The method of claim 19 wherein the positioning assistance data is transmitted during the transmit period via a sidelink.

21. The method of claim 11 wherein the first positioning reference signal and the second positioning reference signal utilize different frequency layers.

22. A user equipment (UE), comprising:
a memory;
at least one transceiver;
at least one processor communicatively coupled the memory and the at least one transceiver and configured to:
receive a first positioning reference signal from a first station at a first time;
receive a second positioning reference signal from a second station at a second time;
receive positioning assistance data associated with positioning reference signals received by a proximate user equipment;
determine a reference signal timing difference based at least in part on the first time and the second time; and
determine a current location based at least in part on the reference signal timing difference and the positioning assistance data.

23. The user equipment of claim 22 wherein the positioning assistance data is received from the proximate user equipment via a sidelink.

24. The user equipment of claim 22 wherein the positioning assistance data is received from a serving station.

25. The user equipment of claim 22 wherein the positioning assistance data includes a signal strength parameter associated with the positioning reference signals received by the proximate user equipment.

26. The user equipment of claim 22 wherein the positioning reference signals received by the proximate user equipment are the first positioning reference signal and the second positioning reference signal.

27. The user equipment of claim 22 wherein the positioning reference signals received by the proximate user equipment are a first beamformed positioning reference signal transmitted from the first station, and a second beamformed positioning reference signal transmitted from the second station.

28. The user equipment of claim 22 wherein at least one of the positioning reference signals received by the proximate user equipment is received at a different time compared to a transmission time of at least one of the first positioning reference signal and the second positioning reference signal.

29. The user equipment of claim 22 wherein the positioning assistance data is a second reference signal timing difference value based at least on part on the positioning reference signals received by the proximate user equipment.

30. The user equipment of claim 22 wherein the positioning assistance data is a synchronization error value based at least on part on the positioning reference signals received by the proximate user equipment.

31. The user equipment of claim 22 wherein the at least one processor is further configured to receive a receive period information indicating a time period the positioning assistance data is transmitted.

32. A user equipment (UE), comprising:
a memory;
at least one transceiver;
at least one processor communicatively coupled the memory and the at least one transceiver and configured to:
  receive a first positioning reference signal from a first station at a first time;
  receive a second positioning reference signal from a second station at a second time;
  determine a reference signal timing difference based at least in part on the first time and the second time; and
  transmit positioning assistance data, wherein the positioning assistance data is based at least in part on the reference signal timing difference.

33. The user equipment of claim 32 wherein the positioning assistance data is transmitted to a proximate user equipment via a sidelink.

34. The user equipment of claim 32 wherein the positioning assistance data is transmitted to a serving station.

35. The user equipment of claim 32 wherein the at least one processor is further configured to determine a signal strength parameter associated with at least one of the first positioning reference signal and the second positioning reference signal.

36. The user equipment of claim 32 wherein at least one of the first positioning reference signal and the second positioning reference signal is an omnidirectional positioning reference signal.

37. The user equipment of claim 32 wherein at least one of the first positioning reference signal and the second positioning reference signal is an beamformed positioning reference signal.

38. The user equipment of claim 32 wherein the positioning assistance data is the reference signal timing difference.

39. The user equipment of claim 32 wherein the positioning assistance data is a synchronization error value based at least on part on the first positioning reference signal and the second positioning reference signal.

40. The user equipment of claim 32 wherein the at least one processor is further configured to receive transmit period information indicating a time period to transmit the positioning assistance data.

41. The user equipment of claim 40 wherein the positioning assistance data is transmitted during the transmit period via a sidelink.

42. The user equipment of claim 32 wherein the first positioning reference signal and the second positioning reference signal utilize different frequency layers.

43. An apparatus, comprising:
  means for receiving a first positioning reference signal from a first station at a first time;
  means for receiving a second positioning reference signal from a second station at a second time;
  means for receiving positioning assistance data associated with positioning reference signals received by a proximate user equipment;
  means for determining a reference signal timing difference based at least in part on the first time and the second time; and
  means for determining a current location based at least in part on the reference signal timing difference and the positioning assistance data.

44. An apparatus, comprising:
  means for receiving a first positioning reference signal from a first station at a first time;
  means for receiving a second positioning reference signal from a second station at a second time;
  means for determining a reference signal timing difference based at least in part on the first time and the second time; and
  means for transmitting positioning assistance, wherein the positioning assistance data is based at least in part on the reference signal timing difference.

45. A non-transitory processor-readable storage medium comprising processor-readable instructions configured to cause one or more processors to determine a current location, comprising:
  code for receiving a first positioning reference signal from a first station at a first time;
  code for receiving a second positioning reference signal from a second station at a second time;
  code for receiving positioning assistance data associated with positioning reference signals received by a proximate user equipment;
  code for determining a reference signal timing difference based at least in part on the first time and the second time; and
  code for determining the current location based at least in part on the reference signal timing difference and the positioning assistance data.

46. A non-transitory processor-readable storage medium comprising processor-readable instructions configured to cause one or more processors to provide positioning assistance data, comprising:
  code for receiving a first positioning reference signal from a first station at a first time;
  code for receiving a second positioning reference signal from a second station at a second time;
  code for determining a reference signal timing difference based at least in part on the first time and the second time; and
  code for transmitting positioning assistance data, wherein the positioning assistance data is based at least in part on the reference signal timing difference.

* * * * *